(12) United States Patent
Okamoto et al.

(10) Patent No.: US 6,522,078 B1
(45) Date of Patent: Feb. 18, 2003

(54) REMOTELY CONTROLLED POWER SUPPLY SWITCHING SYSTEM

(75) Inventors: Kazutaka Okamoto, Miyanohigashi-machi (JP); Noboru Hayakawa, Miyanohigashi-machi (JP); Hiroji Kohsaka, Miyanohigashi-machi (JP)

(73) Assignee: Horiba, Ltd., Tokyo (JP)

( * ) Notice: Subject to any disclaimer, the term of this patent is extended or adjusted under 35 U.S.C. 154(b) by 0 days.

(21) Appl. No.: 09/648,728

(22) Filed: Aug. 25, 2000

(30) Foreign Application Priority Data

| Aug. 27, 1999 | (JP) | ............................................. 11-242155 |
| Aug. 31, 1999 | (JP) | ............................................. 11-244900 |
| Nov. 16, 1999 | (JP) | ............................................. 11-325289 |
| Apr. 26, 2000 | (JP) | ........................................... 2000-126487 |

(51) Int. Cl.[7] ............................................. H05B 41/36
(52) U.S. Cl. ........................ 315/149; 307/116; 340/565; 340/573
(58) Field of Search ................................ 315/149, 150, 315/151, 159; 250/330, 332, 334, 338.1, 491.1; 307/112, 116, 117, 125, 139, 141; 340/541, 565, 573

(56) References Cited

U.S. PATENT DOCUMENTS

| 3,584,222 A | * | 6/1971 | Nesbitt ........................ 250/206 |
| 5,065,104 A | * | 11/1991 | Kusko et al. ................ 324/122 |
| 5,189,393 A | | 2/1993 | Hu ............................... 340/522 |
| 5,293,097 A | * | 3/1994 | Elwell .......................... 315/159 |
| 5,455,487 A | * | 10/1995 | Mix et al. .................... 315/150 |
| 5,834,765 A | * | 11/1998 | Ashdown .............. 250/214 AL |
| 5,886,821 A | * | 3/1999 | Sohn ........................ 250/338.3 |
| 5,977,882 A | * | 11/1999 | Moore .................... 340/825.72 |

FOREIGN PATENT DOCUMENTS

| JP | 406337290 A | * 12/1994 |

* cited by examiner

*Primary Examiner*—Don Wong
*Assistant Examiner*—Thuy Vinh Tran

(57) ABSTRACT

A remote power switching system capable of detecting the emission of infrared thermal energy from a human body or other objects and automatically controlling a supply of power to electric equipment is provided. A controller unit having a switching unit capable of connecting to a source of power and controlling the output of power to a device that utilizes the power, incorporates a wireless receiver unit for receiving control signals to operate the switching unit. The controller unit can further include electronic prongs and electrical receptacles for providing a plug in connection for the device to be controlled. A remote controller that can be portable and of hand size has a first sensor unit for determining the presence of an object that intrudes within the predetermined zone. A transmitter unit can transmit a wireless signal when a control unit receives a signal from the first sensor unit. A second sensor unit can determine ambient light conditions which can also be considered by the control unit in determining the appropriateness of sending a wireless signal. Finally, control members can be used to delay the activation of the remote controller for a predetermined time period.

15 Claims, 17 Drawing Sheets

REMOTELY CONTROLLED POWER SUPPLY SWITCHING SYSTEM

BACKGROUND OF THE INVENTION

1. Field of the Invention

The present invention relates to a power supply switching system that can be automatically controlled by a remote sensor system.

2. Description of the Prior Art

As an apparatus for detecting a human body, an apparatus for remotely detecting a human body in a non-contact state by employing a pyroelectric infrared detector has been hitherto widely used as a customer sensor disposed at a shop for ringing a chime or playing music when a customer enters the shop, an automated lighting system for turning on a light when a person approaches and an automatic control system such as an intrusion alarm system for actuating an alarm. Namely, most of infrared human body detectors thus widely used have employed fixed control target equipment to be controlled by the detection of a human body.

The conventional infrared human body detector has, however, a disadvantage in that accurate automatic control cannot be conducted in accordance with a control target electric equipment. If the detector controls, for example, a lighting equipment as a control target electric equipment, the detector can detect an infrared radiation emitted from a human body and automatically turn on the lighting equipment. However, it turns on the lighting equipment upon detecting the movement of a human body even when a user does not want to turn it on because there exists luminance to some extent.

Furthermore, the infrared human body detector can automatically turn off the lighting equipment to thereby advantageously save power when a human body undetected sate continues. The detector, however, also inadvertently turns off the lighting equipment after a certain time when a user is motionless.

Thus, the prior art devices have limitations that limit their use and they are frequently expensive.

SUMMARY OF THE INVENTION

The present invention has been made in view of the above-stated circumstances. It is, therefore, an object of the present invention to provide a power supply switching system capable of detecting an infrared ray from a human body or other object emitting thermal energy to thereby automatically control supply of power to electric equipment at a distant position and capable of realizing more accurate power supply control in accordance with a target electric equipment so as to meet the users' intention and demand.

According to the present invention, means for obtaining the above object are constituted as follows:

According to the invention, there is provided a power supply switching system having an electric equipment and a remote controller for on/off control of the electric equipment and for establishing communication between the electric equipment and the remote controller by near-infrared rays. The power supply system is characterized in that the remote controller has input switches for conducting the on/off controlling and an infrared detector for detecting an infrared ray from a human body and on-controlling of at least the electric equipment at an electric equipment side.

According to the invention, there is provided a power supply system provided with an electric equipment and a remote controller for on/off controlling the electric equipment and for establishing communication between the electric equipment and the remote controller by near-infrared rays. The power supply system is characterized in that the remote controller has input switches for conducting the on/off controlling and an infrared detector for detecting an infrared ray from a human body and for on controlling of at least the electric equipment at a remote controller side.

Furthermore, according to the invention, there is provided a power supply system consisting of a controller connected between an electric equipment actuated by a commercial power source and the commercial power source and controlling supply of power to the electric equipment and a remote controller transmitting a near-infrared basis control signal to the controller and controlling the supply of power conducted by the controller. The power supply system is characterized in that the remote controller is provided with input switches for outputting a control signal to forcedly switch a state of the controller between a power supply state and a power non-supply state and a human body detector for detecting an infrared ray from a human body and switching the state of the controller to the power supply state at one of the controller and the remote controller.

Therefore, the power supply system can not only automatically control supply of power to the electric equipment upon detecting a human body without the need to install special wiring but can also provide a forced supply of power in accordance with user's intention and demand by operating the input switches provided at the remote controller. That is, by forcedly switching the state of the controller from/to a power supply state to/from a power non-supply state, it is possible not to actuate the electric equipment even if an infrared ray is detected from a human body when the user does not want to actuate the electric equipment and to continue actuating the electric equipment when the user desires this action.

If the human body detector is provided at the controller, then the user holds the remote controller and operates input switches from outside of the range in which the human body detector detects a human body to thereby switch the state of the controller to a power non-supply state. By doing so, it is possible to prevent the human body detector from starting detection immediately and the state of the controller from being switched to a power supply state. Further, if the human body detector is provided at the remote controller, the remote controller is disposed at an optimum position for the detection of a human body, thereby making it possible to surely detect a human body and to appropriately control the electric equipment.

For example, an air-conditioner such as a fan or a heater is connected to the electric equipment supplied with power by the power supply system, whereby it is possible to detect that a person waves one's hand when it is hot or cold or a person tosses about when the person cannot sleep well and to actuate the air-conditioner. If a stereo and the like is connected as an electric equipment, it can be automatically actuated when a person enters a room or wakes up.

Further, if the controller or the remote controller is provided with a timer for making the controller maintain its power supply state for a predetermined time, a user sets the timer to thereby allow setting a time period for the power supply operation following the detection of a human body. That is, when a ventilation is connected as an electric equipment, the ventilation can be controlled to be automatically actuated and be operated according to the timer.

Such a setting that the controller is turned into a power supply state following the detection of a human body and maintains its power supply state without actuating the timer, is effective if an electric equipment such as a lighting equipment or an air conditioner which is always actuated when a user enters a room and is required to be continuously supplied with power thereafter is employed. That is, since the user does not need to look for an operation section for actuating such an electric equipment when entering the room, such a setting is particular effective in the environment such as a hotel in which the user is unfamiliar with the equipment.

Further, if either the controller or the remote controller is provided with a sensor mode switch for turning the controller into a power non-supply state for a predetermined time and then into a wait state allowing the state of the controller to be switched to a power supply state following the detection of a human body by the human body detector as an input switch, supply of power by the controller can be forcedly stopped by remote control and, at the same time, it is possible to suppress the state of the controller from being switched to a power supply state upon the detection of a human body by the human body detector for a predetermined time. Therefore, if supply of power to the electric equipment is temporarily stopped and the user leaves the spot, it is possible to prevent the human body detector from detecting the movement of the user to thereby start supplying power to the electric equipment again.

If either the controller or the remote controller is provided with a sensor mode switch for turning the controller into a power supply state only for a predetermined time and then temporarily turning it into a power non-supply state and a wait state allowing the state of the controller to be switched to a power supply state upon the detection of an infrared ray by the human body detector, it is possible not only to have the controller start supply of power by remote control but also to actuate the electric equipment only for the predetermined time.

Namely, if the electric equipment is a lighting equipment, the switch is used to switch the state of the controller into a wait state. Even if the user leaves the spot, the equipment is turned on only for a predetermined time, so that it is possible to prevent the illumination from instantly becoming dark or the light from being unnecessarily turned on for a long time. If other electric equipment is connected, it is possible to check the operation thereof for the predetermined time. Specifically, in case of a stereo, it is possible to check volume or channel setting for the predetermined time during an initial set up of conditions.

Moreover, if either the controller or the remote controller is provided with an ambient illumination detector and the remote controller is provided with an input switch for an ambient illumination monitor setting for controlling the controller so that the state of the controller is switched to a power supply state only when the human body detector detects a human body movement in the environment in that the ambient illumination is not more than a threshold illumination, then it is possible to set operation environment of the electric equipment connected thereto. That is, if an electric equipment such as a lighting equipment which operation is unnecessary in a bright environment is actuated, it is possible to prevent unnecessary power consumption. Further, if an alarm buzzer is connected to the power supply system and disposed at the entrance, it is possible to give an alarm for an intruder at nighttime.

Likewise, if either the controller or the remote controller is provided with an ambient illumination detector and the remote controller is provided with an input switch for an ambient illumination monitor setting for controlling the controller so that the state of the controller is switched to a power supply state only when the human body detector detects a human body movement in the environment in which illumination is not less than a threshold illumination, then it is possible to automatically actuate the electric equipment only when the user is, for example, not asleep. That is, it is possible to avoid such deficiency that a lighting equipment is turned on or a stereo is actuated following the detection of the user's movement such as tossing about in sleep as a human body movement.

If the remote controller is provided with a power setting input switch for setting power level to be supplied by the controller, it is possible to supply reduced power to an electric equipment such as a fan, to set the fan to blow a breeze and to realize energy saving. In addition, if a lighting equipment is connected, it is possible to lower brightness of the light. Therefore, if the lighting equipment is used in a bedroom, it is possible to set the equipment not to emit bright light after it is detected that the user moves to go to the toilet and to avoid making the user feel uncomfortable.

DETAILED DESCRIPTION OF THE PREFERRED EMBODIMENTS

Figure 1:
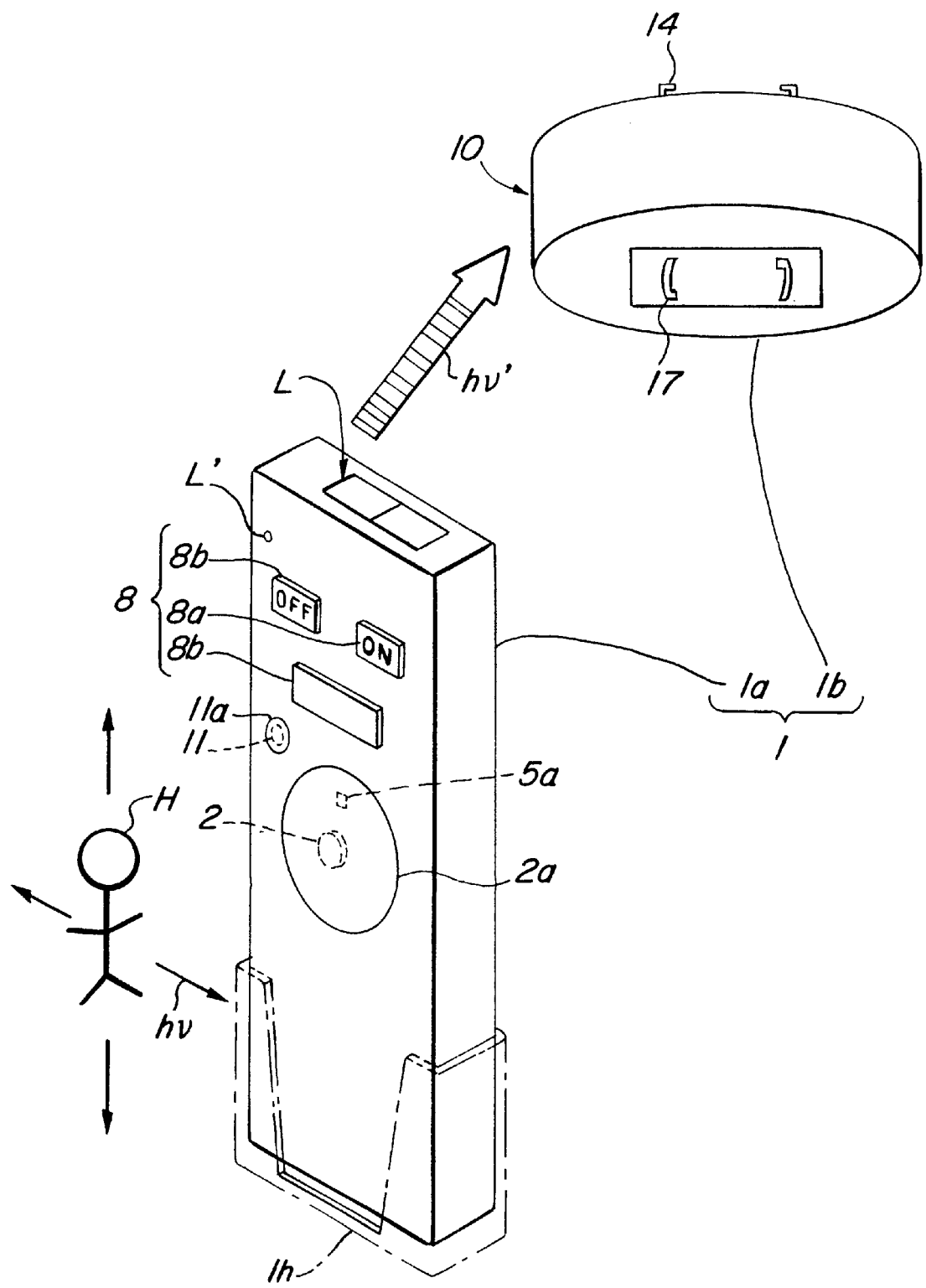
FIG. 1 is a perspective view showing the first embodiment of a power supply switching system according to the present invention.
Figure 2:
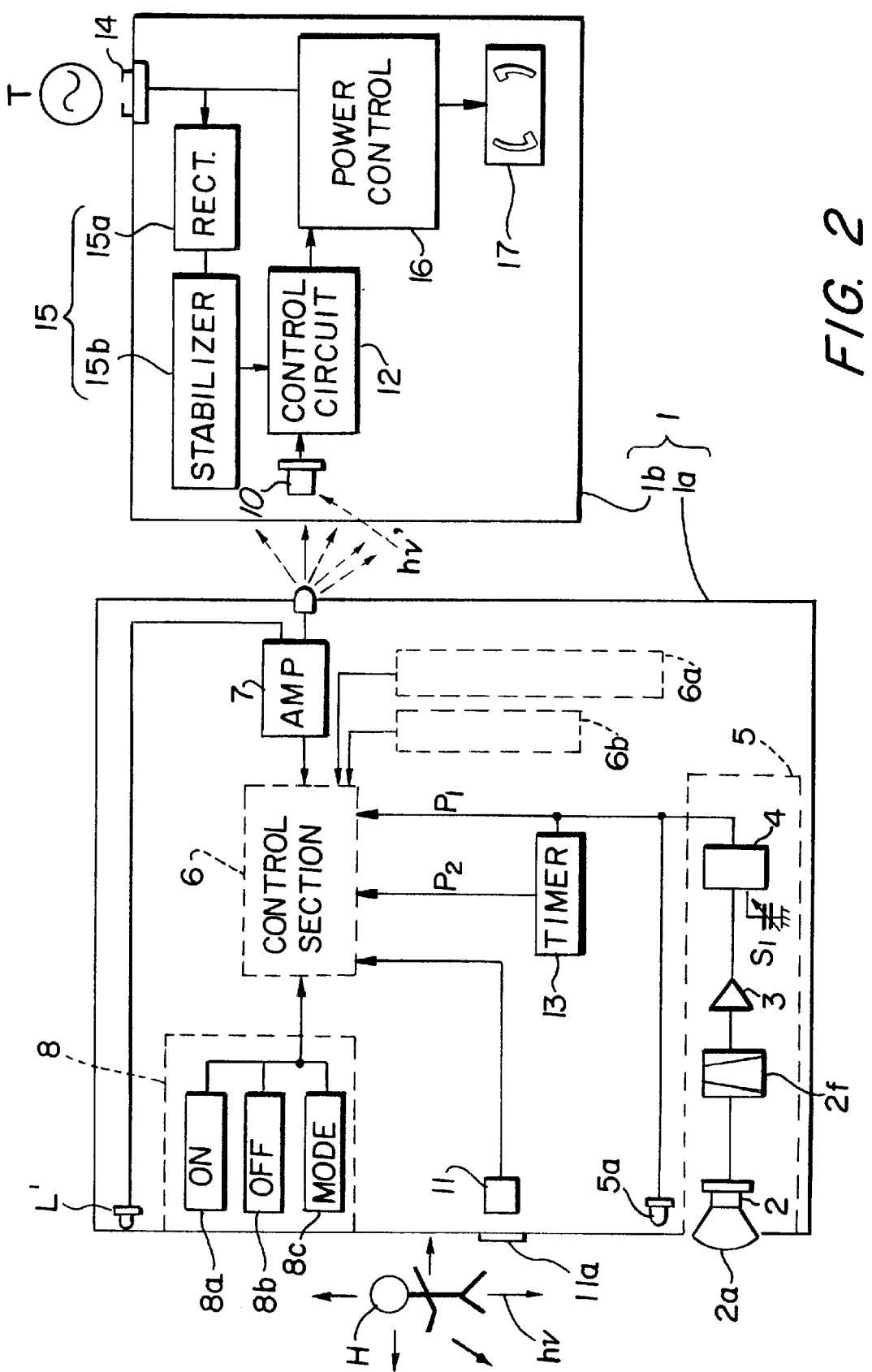
FIG. 2 is a block diagram showing the power supply switching system.

The exact nature of this invention, as well as its objects and advantages, will become readily apparent from consideration of the following specification as illustrated in the accompanying drawings, in which like reference numerals designate like parts throughout the figures thereof, and wherein:

FIGS. 1 and 2 show a first embodiment of the present invention. In FIGS. 1 and 2, reference symbol 1 denotes a power supply system for detecting an infrared ray hv at a wavelength of about 10 μm emitted from a human body H or other object and for controlling a power source to be supplied to an electric equipment such as a ceiling attachment type lighting equipment. The power supply switching system 1 consists of a remove controller 1a and a controller 1b. In this embodiment, an example of using a lighting equipment as the electric equipment is disclosed. The controller 1b is shaped so as to be attached to a lighting attachment connector (normally referred to as "hook ceiling" or "rosette") prepared in advance and serving as a terminal. The shape of the controller 1b may be that of an ordinary socket-plug to allow the controller 1b to control the lighting equipment which is not a ceiling attachment type and control all other types of electric equipment.

As shown in the block diagram of FIG. 2, the remote controller 1a has a human body detector 5 which consists of a pyro-sensor 2 receiving and sensing an infrared ray hv emitted from the human body H through a Fresnel lens 2a, a bandpass filter 2f passing only a signal with a frequency of, for example, 0.5 to 5 Hz among output signals from the pyro-sensor 2, an amplifier 3 amplifying the signal passing the filter 2f, and a comparator 4 comparing the amplified output signal with a threshold $S_1$ and outputting a human body detection pulse $P_1$. The Fresnel lens 2a can divide the view angle into a plurality of zones so that movement of a human body can be detected as pulses on a pyro-sensor 2, such as a ceramic lead zirconate titanate detector element. Infrared energy striking the pyro-sensor 2 raises its temperature and generates an electric charge which is converted into electrical signals that can be processed to detect human movement. The rate of the pulses can set the frequency of movement. It is also possible to employ an infrared filter to limit the detected energy to the range of a human. Needless to say, appropriate values can be selected for frequencies out by the bandpass filter 2f as so as to prevent such frequencies from being influenced by slow temperature change noise due to a blowing of wind, sun rays and the like.

Further, the remote controller 1a has a light emitting diode 5a for monitoring an infrared ray hv detection state of the human body detector 5 to indicate an on state, a near-infrared remote controller control section 6 receiving the human body detection pulse $P_1$ from the human body detector 5 and carrying out an appropriate operation according to the operation mode of the power supply switching system 1 and generating a control signal transmitted to control the power supply of the controller 1b, an amplifier 7 amplifying the control signal, a near-infrared light emitting diode L for converting the amplified control signal into a near-infrared ray hv' at a wavelength of about 0.7 to 1.3 μm, a visible light emitting diode L' for monitoring the output state of the control signal, an input switch 8 for inputting various commands to the near-infrared remote controller control section 6, a light sensor 11 (which is one example of an ambient illumination detection unit and may be, for example, a cadmium sulfide cell CdS or Si photo-cell) for detecting ambient light levels and a timer circuit 13 generating a pulse $P_2$ for a certain period following the generation of the human body detection pulse $P_1$.

The near-infrared remote controller control section 6 has a transmission code storage unit 6a storing the transmission code of a control command to be transmitted to the controller 1b, and an oscillation circuit 6b generating a modulation fundamental wave. The near-infrared remote controller control section 6 not only generates the near-infrared ray hv' control signal but also controls the remote controller 1a by various input pulses $P_1$, $P_2$ and the ambient illumination detection signal of the light sensor 11 according to the operation mode of the power supply system 1.

For example, the near-infrared remote controller control section 6 in this embodiment does not transmit a control signal for switching the state of the controller 1b to a power supply state when the ambient illumination is not less than 50 luces even if receiving the pulses $P_1$ and $P_2$, thereby preventing the lighting equipment from being turned on in a sufficient ambient illumination environment every time a human body is detected. The present invention is not, however, intended to be limited to control an operation based on ambient illumination. This control function can be, therefore, omitted.

In this embodiment, a light shielding seal or mask 11a is bonded to the light sensor 11. Accordingly, while this light shielding seal 11a is bonded thereto, the lighting equipment is turned on whenever a human body is detected irrespective of the ambient illumination. By doing so, if a user wants to conduct control based on ambient illumination, the light shielding seal 11a can be peeled off. Needless to say, an open/closed window or shutter member made of a light shielding plate may be formed on the housing instead of the light shielding seal 11a. The user could control the sensing level of illumination by employing several different labels with different levels of light transmittance or by controlling the degree of opening of the shutter member.

Further, the present invention is not limited to suppressing a switching state of the controller to a power supply state when ambient illumination is bright. It is also possible to suppress switching the state to a power supply state or a restricted power supply state in an environment in which ambient illumination is equal to or lower than a given threshold. In the latter case, it is possible to avoid inadvertently turning on the lighting equipment at midnight or tuning on a bright light.

Further, the above-stated control operations based on ambient illumination may be constituted in combination. The threshold of the ambient illumination can be adjusted in a range of several tens of luces to several hundreds of luces. That is, if the human body detector 5 detects a human body and ambient illumination is dark, that is not more than 10 luces, then damped power is supplied. If the ambient illumination is 10 to 50 luces, the state of the controller is switched to a normal power supply state. If it is not less than 50 luces, the state of the controller is not on switched. By providing such a setting, it is possible to avoid dazzling a user by applying strong light to a user's eyes familiar to the dark or turning an unnecessary lighting equipment on at daytime.

Additionally, the human body detector 5 is provided at the remote controller 1a in this embodiment, the near-infrared remote controller control section 6 can control the controller to ignore the human detection pulse $P_1$ of the human body detector 5 and not to generate a near-infrared ray hv' depending on the operation mode. Also, the near-infrared remote controller control section 6 can control the controller to maintain a power supply state by using the timer circuit 13.

The timer circuit 13 is, for example, a one-shot multivibrator and the width of the output Pulse $P_2$ is set at, for example, 10 minutes in this embodiment. Therefore, using; the output pulse $P_2$ of the timer circuit 13, the near-infrared remote controller 6 can maintain the controller 1b in a power supply state for 10 minutes after receiving a human body detection pulse $P_1$ from the human body detector 5. It is also possible to set the controller 1b in a power non-supply state when human body movement is not detected for a period of time, such as an undetected state continues for 10 minutes. Needless to say, the time set by the timer circuit 13 should not be limited to 10 minutes and can be changed by the user.

In this embodiment, an example of attaching the light emitting diode L onto the upper surface of the remote controller 1a is disclosed. The present invention is not intended to limit the attachment position of the light emitting diode L. For example, the light emitting diode L can be provided on the front surface or side surface of the remote controller 1a to allow a near-infrared ray hv' to easily reach the controller 1b while the remote controller 1a is attached to a wall surface. Further, the light emitting diode L can be provided on the entire surface of the remote controller 1a to thereby ensure that the near-infrared ray hv' reaches the controller 1b irrespective of circumstances in which the remote controller 1a may be left.

Furthermore, in the above-stated embodiment, an example of providing the human body detector 5 at the remote controller 1a is disclosed. With such a configuration, by changing the installation position of the remote controller 1a. (i.e., the attachment position of a remote controller holder 1h), it is possible for the human body detector 5 to detect a human body more accurately. The present invention should not be limited thereto. It is also possible to provide the human body detector 5 at the controller 1b side.

Likewise, in the present embodiment, the light sensor 11 is provided at the remote controller 1a side, thereby making it possible to advantageously control supply of power to the electric equipment according to the quantity of sunlight by putting the remote controller 1a at a window. If this light sensor 11 is provided at the controller 1b side, room luminance can be detected irrespective of the position at which the remote controller 1a is placed. Accordingly, the present invention is not intended to limit the position at which the ambient illumination detector 11 (light sensor) is attached.

On the other hand, the controller 1b has a near-infrared light receiving element 10 receiving a near-infrared ray hv' transmitted from the light emitting diode L, a control circuit 12 interpreting a control signal from the near-infrared ray received by the near-infrared ray receiving element 10 and controlling the controller 1b, a power source input section 14 connected to a commercial power source T, a DC power circuit 15 consisting of a rectification circuit 15a connected to the power source input section 14 and rectifying it, and a stabilization power circuit 15b supplying stable DC power, an output power controller 16 switching the state of the power inputted from the power source input section 14 between a supply state and a non-supply state according to a control signal from the remote controller 1a, and a power source output section 17 for supplying power from the output power controller 16 to the electric equipment.

As shown in FIG. 1, the input switch 8 has, for example, a power ON switch 8a, a power OFF switch 8b and a sensor mode switch 8c. The power ON switch 8a is an input switch for forcing the controller 1b to supply power even if the human body detector 5 does not detect a human body.

Therefore, by depressing the power ON switch 8a, the user can switch the power supply system I to a manual mode, whereby the controller 1b can be maintained in a power supply state without the detection of a human body by the human body detector 5 and power can be continuously supplied to the lighting equipment. Thus, it is possible to eliminate chances of turning off light while a person is in the room.

The power OFF switch 8b is, by contrast, an input switch for stopping supply of power. In a state in which power is being supplied in response to the power ON switch 8a or in a state in which the sensor mode switch 8c is functioning (including a wait state), supply of power to the electric equipment is stopped when the power OFF switch 8b is depressed. Then, by operating the power OFF switch 8b, the user can switch the power supply system 1 to a manual mode.

Next, the sensor mode switch 8c is an input switch for switching the power supply system 1 to a sensor mode in which the state of the controller 1b is automatically switched to a power supply state when the human body detector 5 detects a human body. This switch is used when the user wants to allow the human body detector 5 (human body sensor) to automatically control supply of power while the power supply system 1 set in a manual mode by depressing either the power ON switch 8a or the power OFF switch 8b and the state of the controller 1b is forced to be switched to either a power supply state or a power non-supply state.

When operating the sensor mode switch 8c, the remote controller 1a outputs a near-infrared ray hv' control signal to ignore the human body detection of the human body detector 5 and to force the controller 1b to turn into a power supply state for a predetermined short time, e.g., about 15 seconds. Thereafter, the remote controller 1a outputs a control signal to turn the controller 1b into a power non-supply state and operates to switch the mode to a sensor mode in which the state of the controller 1b is turned into a wait state to wait for the human body detection pulse $P_1$ from the human body detector 5.

That is, by operating the sensor mode switch 8c, the user can switch the state of the power supply system 1 to a wait state (sensor mode) in which the state of the power supply system 1 is switchable to a power supply state by the detection of an infrared ray by the human body detector and can supply power to the electric equipment for a predetermined short time. Therefore, when a user sets the lighting equipment in a sensor mode and leaves a room at night, it is possible to eliminate the possibility that the user feels confused in the dark right after the operation of the switch and supply of power can be stopped in a subsequent short time, thereby making it possible to prevent wasting power. When the user enters the room again, the lighting equipment can be automatically turned on. If an equipment such as a stereo is connected as an electric equipment, checking operations such as settings of volume and/or channels can be carried out in this predetermined time period.

The sensor mode switch 8c may switch the system 1 to a sensor mode after the near-infrared remote controller control section 6 forces the controller 1b to be turned into a power non-supply state for the predetermined short time (e.g., 15 seconds) following the operation of the switch 8c. In that case, it is possible not only to force the controller 1b not to supply power by remote operation but also suppress the human body detector 5 from switching the state of the system 1 to a power supply state for a predetermined time after depressing the switch 8c. Therefore, if supply of power to the electric equipment is stopped and a user leaves the spot, it is possible to prevent the human body detector 5 from detecting the set up operation of the user and inadvertently restarting a supply of power to the electric equipment.

Further, it is possible to repeat a power supply state or a power non-supply state for a short time every time the sensor mode switch 8c is depressed. In other words, when the sensor mode switch 8c is depressed once, a power supply state for a predetermined time (15 seconds) can be obtained. When the sensor mode switch 8c is depressed once again in the power supply state, a power non-supply state for the predetermined time can be obtained. In that case, a user can make the controller 1b stop the supply of power without waiting for the predetermined time, thereby improving convenience and preventing any waste of power.

It is noted that 15 seconds taken as a certain time period for which a human body detection signal is ignored and either a power supply state or a power non-supply state of the controller 1b can be maintained, is only one example and should not limit the present invention. That is, it is possible to set a reasonable, appropriate short time period required to check the operation of the electric equipment and to go out of the human body detection range of the human body detector 5. The time period differs according to the electric equipment to be connected to the system and if the electric equipment is a lighting equipment, several seconds to several tens of seconds will suffice.

Further, the sensor mode switch 8c may be provided as a hidden switch. Namely, in the environment in which a user such as a customer of accommodations is unfamiliar with the position of the power switch of the lighting equipment, a housekeeper who cleans the user's room finally operates the sensor mode switch 8c which is a hidden switch and then leaves the room, whereby the lighting equipment can be set to be turned on, the instant the customer enters the room. Further, if the time of a timer for maintaining a power supply state by the human body detection at this moment is set at, for example, 16 hours or the power supply state is set to be maintained without operating such a timer, then there is no fear of the occurrence of deficiency that the lighting equipment is automatically turned off against the customer's will.

Figure 3:
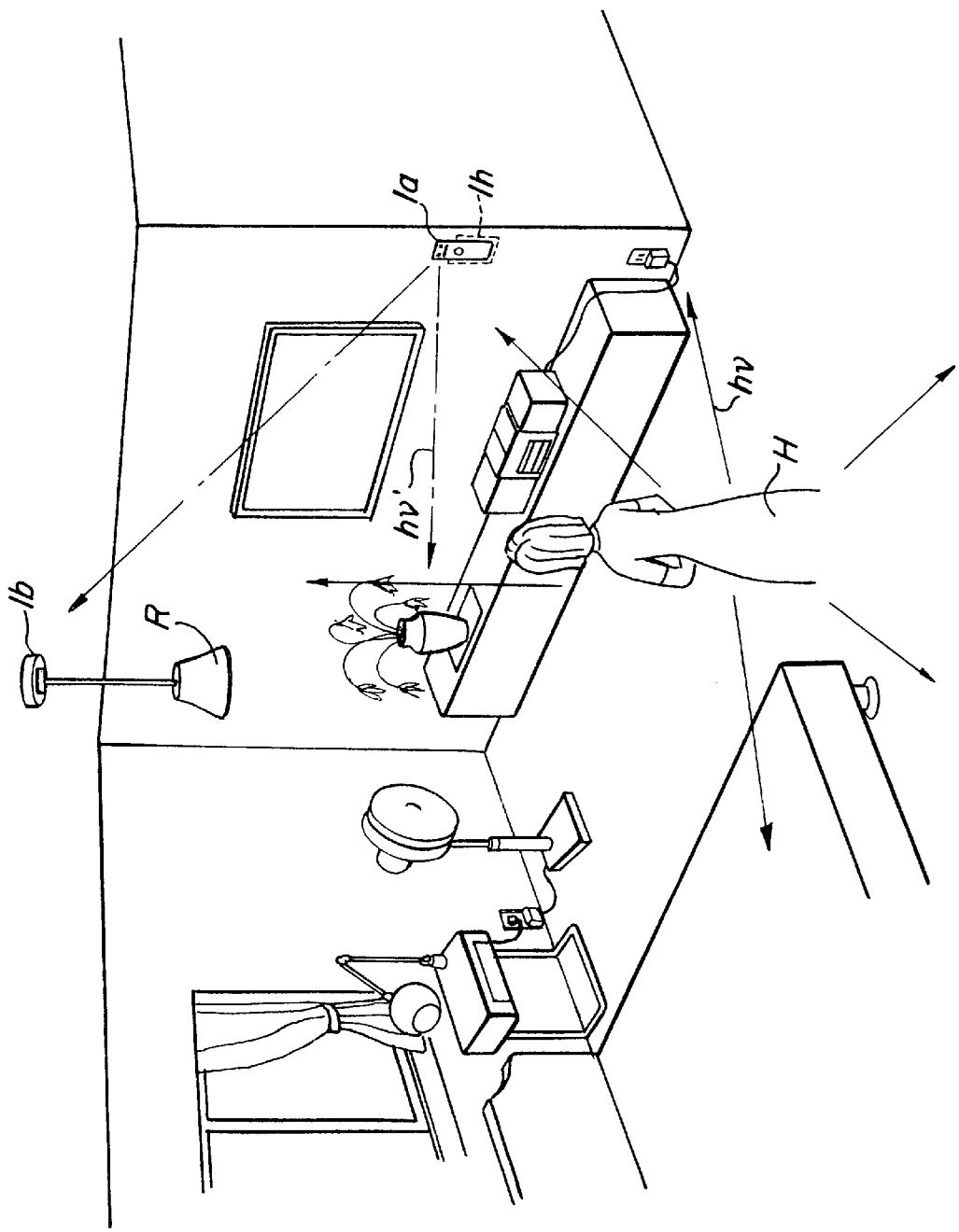
FIG. 3 is a perspective view showing an example of employing the power supply switching system.

FIG. 3 shows an example of supplying power to the lighting equipment using the above-stated power supply system 1. As shown therein, if a lighting equipment R is connected to a lighting attachment connector normally formed on the ceiling through the controller 1b, the lighting equipment R can be operated remotely.

The remote holder 1h is attached to a door-side wall surface of the room. The remote controller 1a is designed to allow the human body detector 5 provided at the remote controller 1a to surely detect any change of infrared intensity caused by the movement of the user H while being put in the remote control holder 1h. By setting the power supply system 1 at a sensor mode, the lighting equipment R can be turned on when the user H enters the room.

Further, if desired, the user H can operate the power ON switch 8a or the power OFF switch 8b with the remote controller 1a in hand to thereby remotely control the lighting equipment R. If the power ON switch 8a is operated, a power supply state can be maintained irrespectively of whether the human body detector 5 detects a human body. Therefore, the lighting equipment R can be turned on even if the user H does not move in the room. Likewise, by operating the power OFF switch 8b, the user H can turn off the lighting equipment R even if the user H is in the room, which is convenient when the user goes to bed.

Further, when leaving the room, the user H operates the sensor mode switch 8c and puts the remote controller 1a in the remote controller holder 1h, whereby the lighting equipment R can be automatically turned on when the user H enters the room next time. Moreover, since the power supply system 1 in this embodiment has the timer circuit 13, lighting time of the lighting equipment R turned on upon the detection of a human body can be set.

If the timer circuit 13 sets the time at, for example, 30 minutes and the user H is not motionless for 30 minutes, the lighting equipment R is not turned off while the user H is in the room. The lighting equipment R can be turned off only if the user H is motionless for a long time such as while sleeping. That is to say, it is possible to set the system so that the user H does not need to operate the lighting equipment R at all by providing the timer circuit 13.

As stated above, by providing the remote controller 1a with the power ON switch 8a, the power OFF switch 8b and the sensor mode switch 8e, it is possible to control the lighting equipment R (electric equipment) in accordance with the particular user's demand.

Namely, in the first embodiment, the power supply system 1 is comprised of the controller 1b serving as a receiver attached between the lighting equipment R provided in the ceiling and the ceiling (terminal) supplying the power source T, and the remote controller 1a serving as a transmitter for transmitting a command to turn on or off the lighting equipment R to the receiver 1b. The remote controller 1a is provided with the pyro-sensor 2 serving as an infrared sensor for automatically detecting a human body and automatically turning on the lighting equipment as well as other control buttons. Hence, the lighting equipment R can be controlled either automatically or manually.

In the meantime, as lighting equipment provided in the ceiling, there are various types of equipment besides the above-stated lighting equipment R, which are as follows:
(1) lighting equipments which do not match to the ceiling and require electric work for wiring;
(2) direct ceiling attachment type lighting equipments which are large, and the controller as a receiver is concealed in the lighting equipment;
(3) lighting equipments so heavy as to exceed ceiling allowable weight;
(4) lighting equipments such as an inverter, the light of the lighting equipment itself is incident on the controller serving as the receiver and may possibly adversely influence the communication sensitivity of the remote controller.

The present invention adopts the following constitutions so as to deal with the above types of lighting equipment.

FIGS. 4 to 7 show a second embodiment of the present invention having a controller 1b serving as a receiver installed on the wall surface or the like and built in an outlet box. In FIGS. 4 to 7, the same reference symbols as those in FIGS. 1 to 3 denote the same or equivalent constituent elements. The second embodiment differs from the first embodiment in the configuration of the controller 1b serving as a receiver and the installation place of the controller 1b.

In FIGS. 4 to 7, reference symbol 30 denotes a switch section for a lighting equipment R' provided on a ceiling surface 31. The switch section 30 consists of a switch panel 32 and a switch box 33. The switch section 30 is disposed in an opening 34 provided on a wall W. Here, the lighting equipment R' may be lighting equipment R employed in the first embodiment or the lighting equipment shown in items (1) to (4) above. Reference symbols 35a and 35b denote power cords from a power source T.

A controller 1b serving as a receiver receives an ON command or an OFF command transmitted from a remote controller 1a serving as a transmitter. The controller 1b is built in an exclusive outlet box 37. Reference symbol 38 denotes a reception panel.

The controller 1b mainly consists of a near-infrared ray receiving element 10, a signal control circuit 12 interpreting a control signal from the near-infrared ray received by the near-infrared ray receiving element 10 and controlling the receiver 36, an output power control section 16 switching the state of power inputted from a power supply input section 14 from/to a power supply state to/from a power non-supply state by a control signal from the remote controller 1a, and power cords 35a and 35b connected to a commercial power source T. Reference symbol 39 denotes the switch of the output power control section 16.

The switch section 30 already provided is detached, the controller 1b is attached to the wall W and predetermined wiring is carried out. As a result, in a state in which the sensor mode switch 8c of the remote controller 1a is operated to thereby switch the mode of the system 1 to a sensor mode in advance, when a user enters a room, the switch 39 of the controller 1b is turned on (see FIG. 5) in response to an ON command transmitted from the remote controller 1a and the lighting equipment R' can be, therefore, controlled remotely.

In this way, only by providing the controller 1b at a position at which the switch section 30 is attached to the wall W, it is possible to control the lighting equipment R' without the need to look for the switch section 30 in the dark room.

Figure 4:
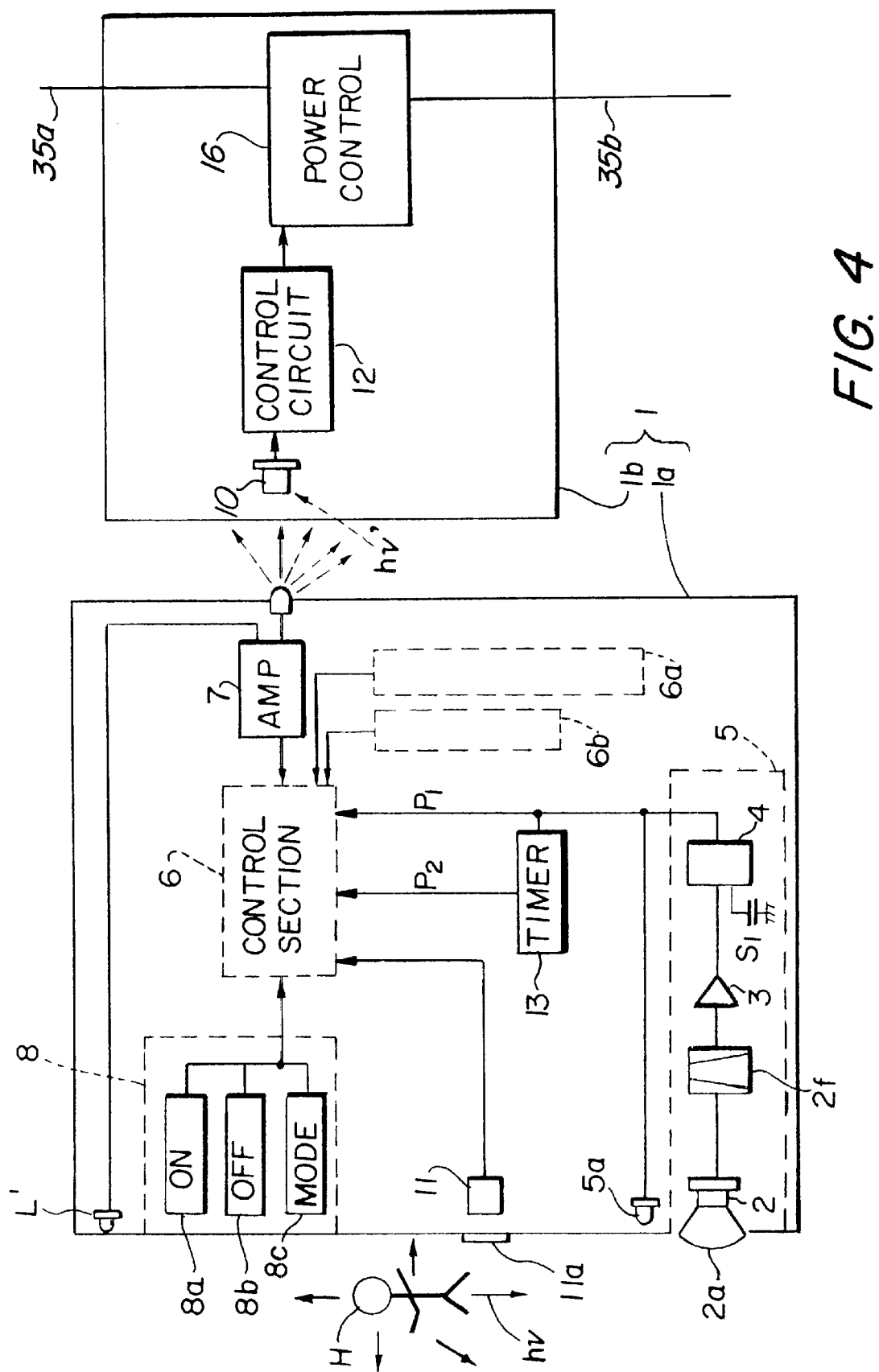
FIG. 4 is a block diagram showing the second embodiment of the power supply switching system according to the present invention.
Figure 5:
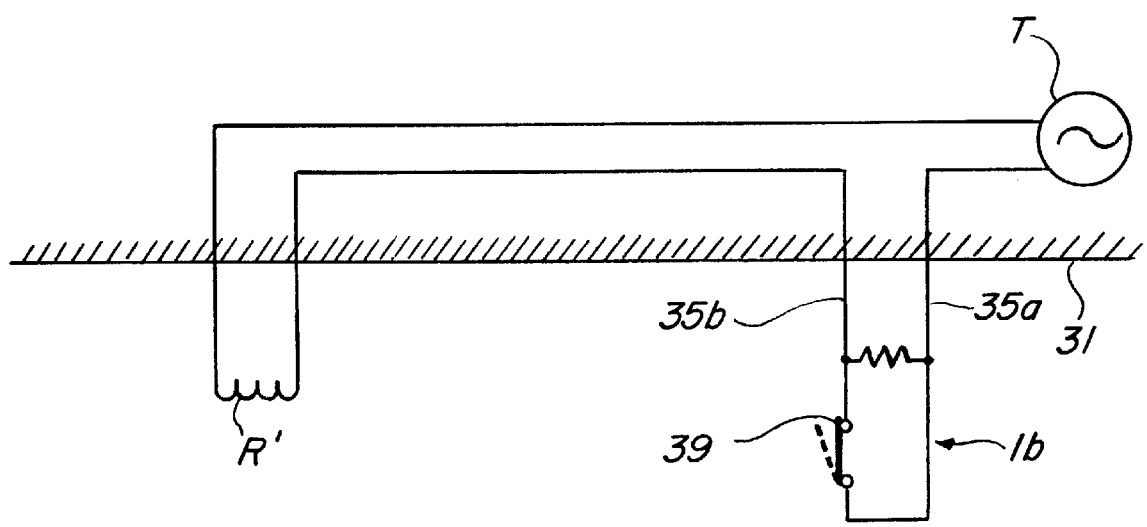
FIG. 5 is an equivalent circuit diagram in the second embodiment.
Figure 6:
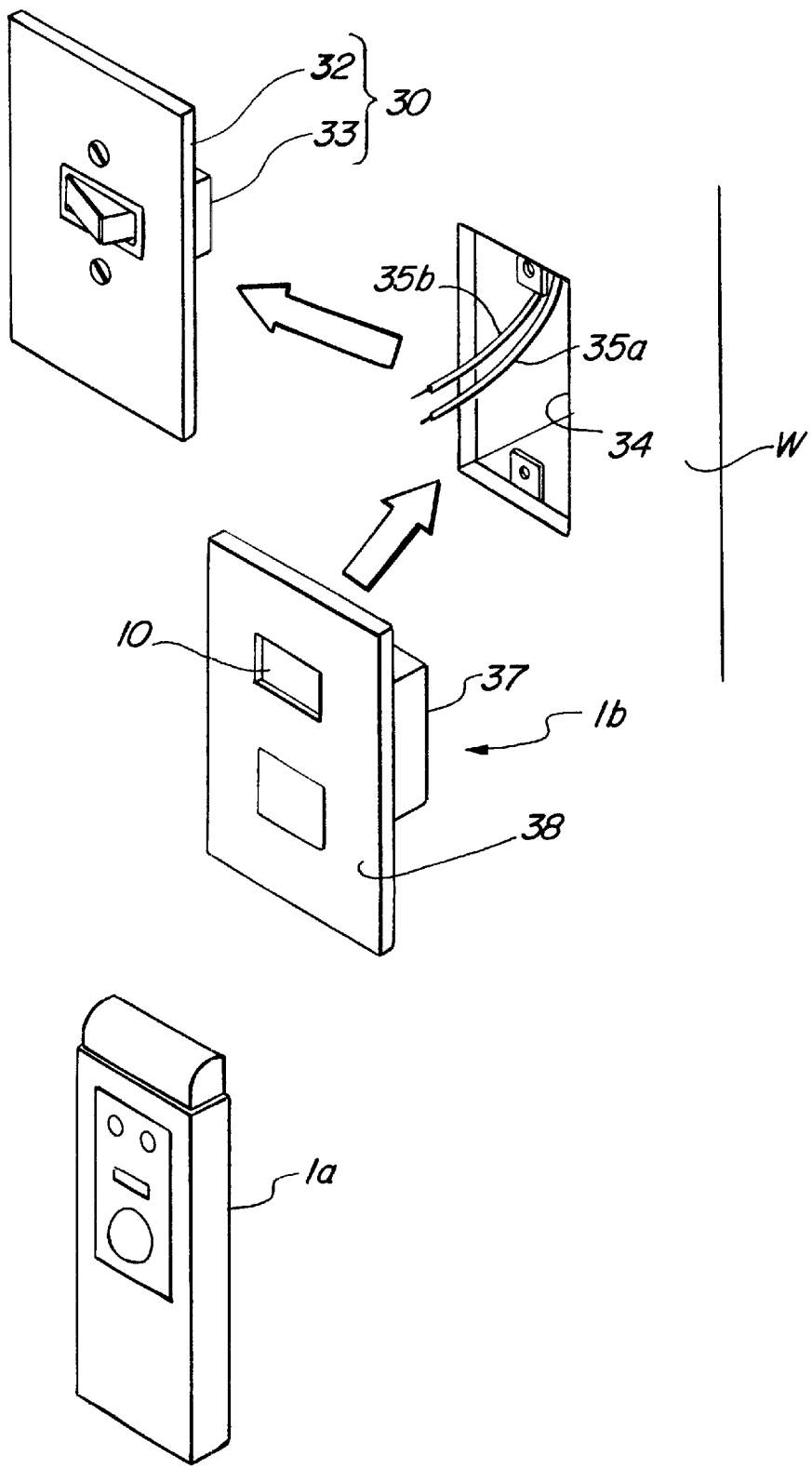
FIG. 6 is an exploded perspective view showing an attachment operation in the second embodiment.
Figure 7:
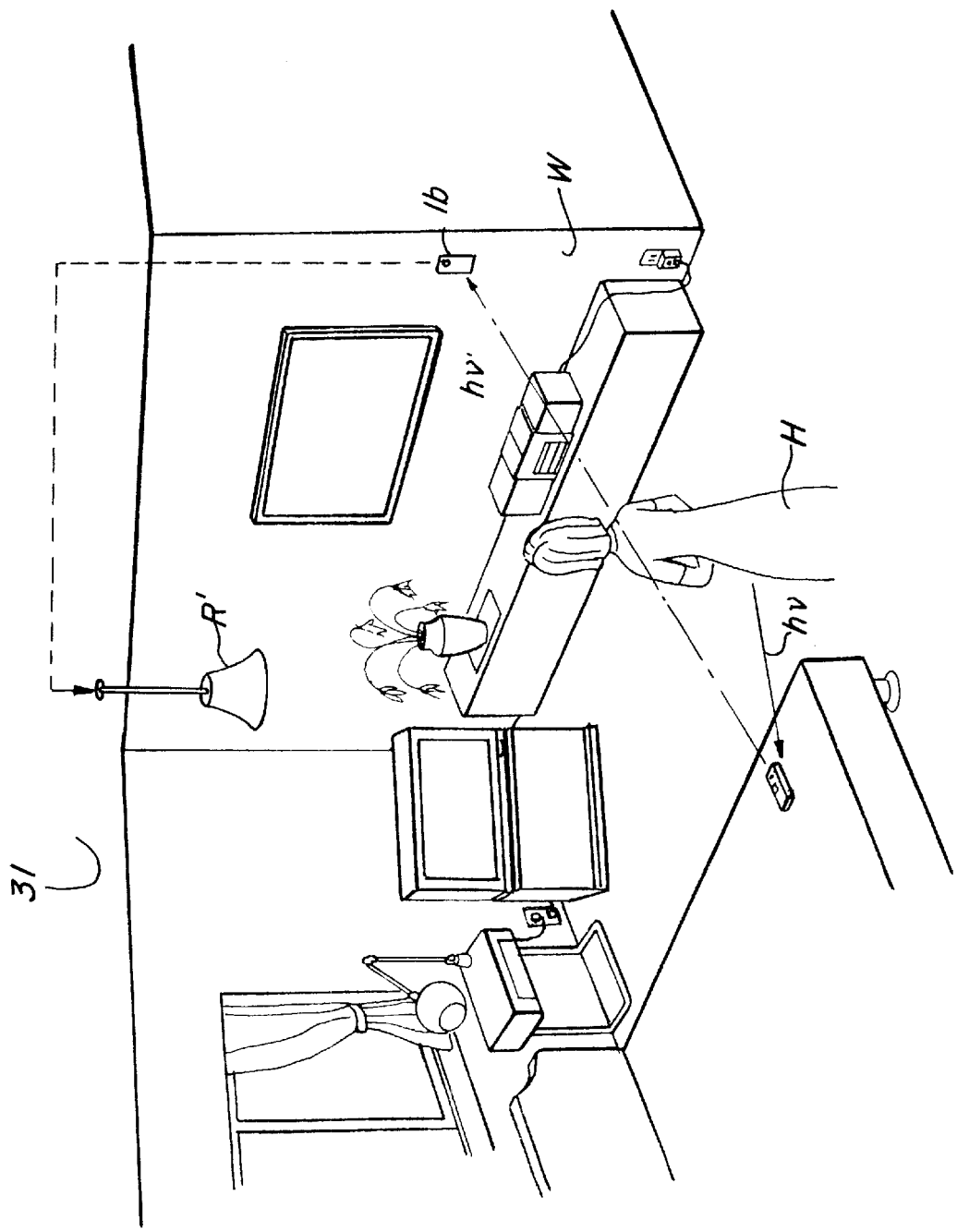
FIG. 7 is a perspective view showing an example of using the second embodiment.
Figure 8:
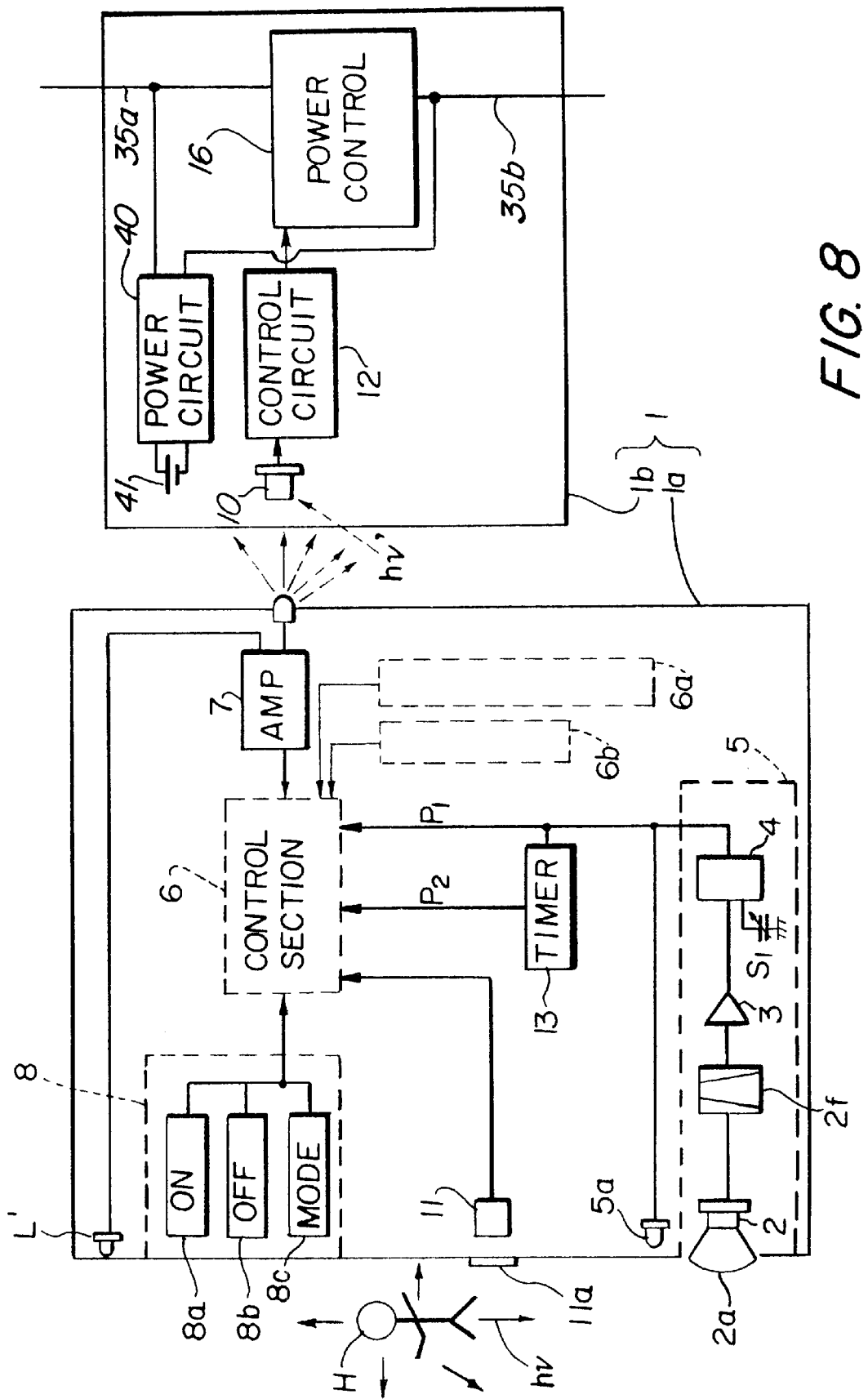
FIG. 8 is a block diagram showing a modified example of the second embodiment.

In FIG. 4, the drive source of the signal control circuit 12 is not shown. As the drive source, for example, a power circuit 40 constituted as shown in FIG. 8 may be used. Namely, it is possible to provide the controller 1b with the power circuit 40 for driving the signal control circuit 12 and further provide the power circuit 40 with an auxiliary charging battery 41.

Figure 9:
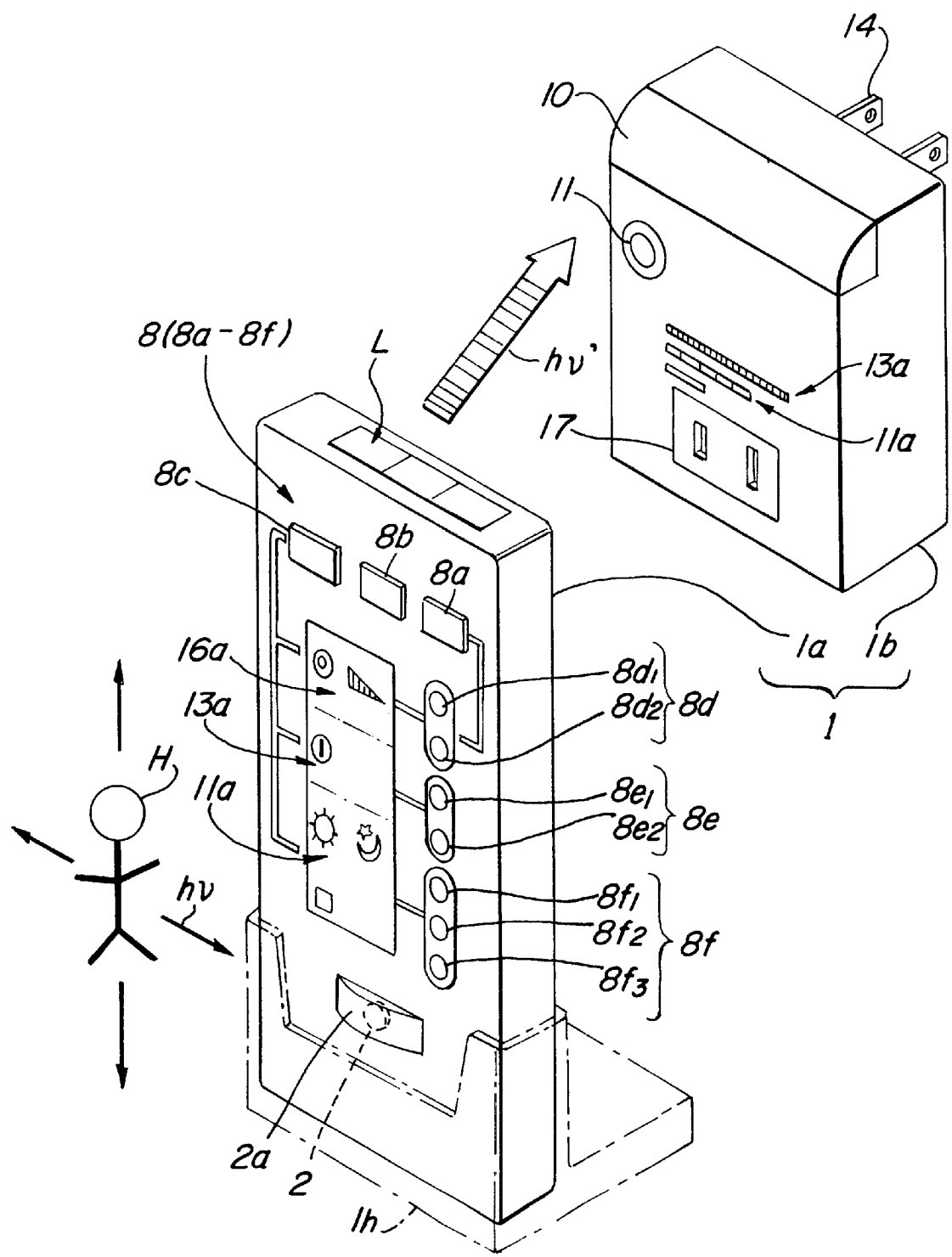
FIG. 9 is a perspective view showing the third embodiment of the power supply switching system according to the present invention.
Figure 10:
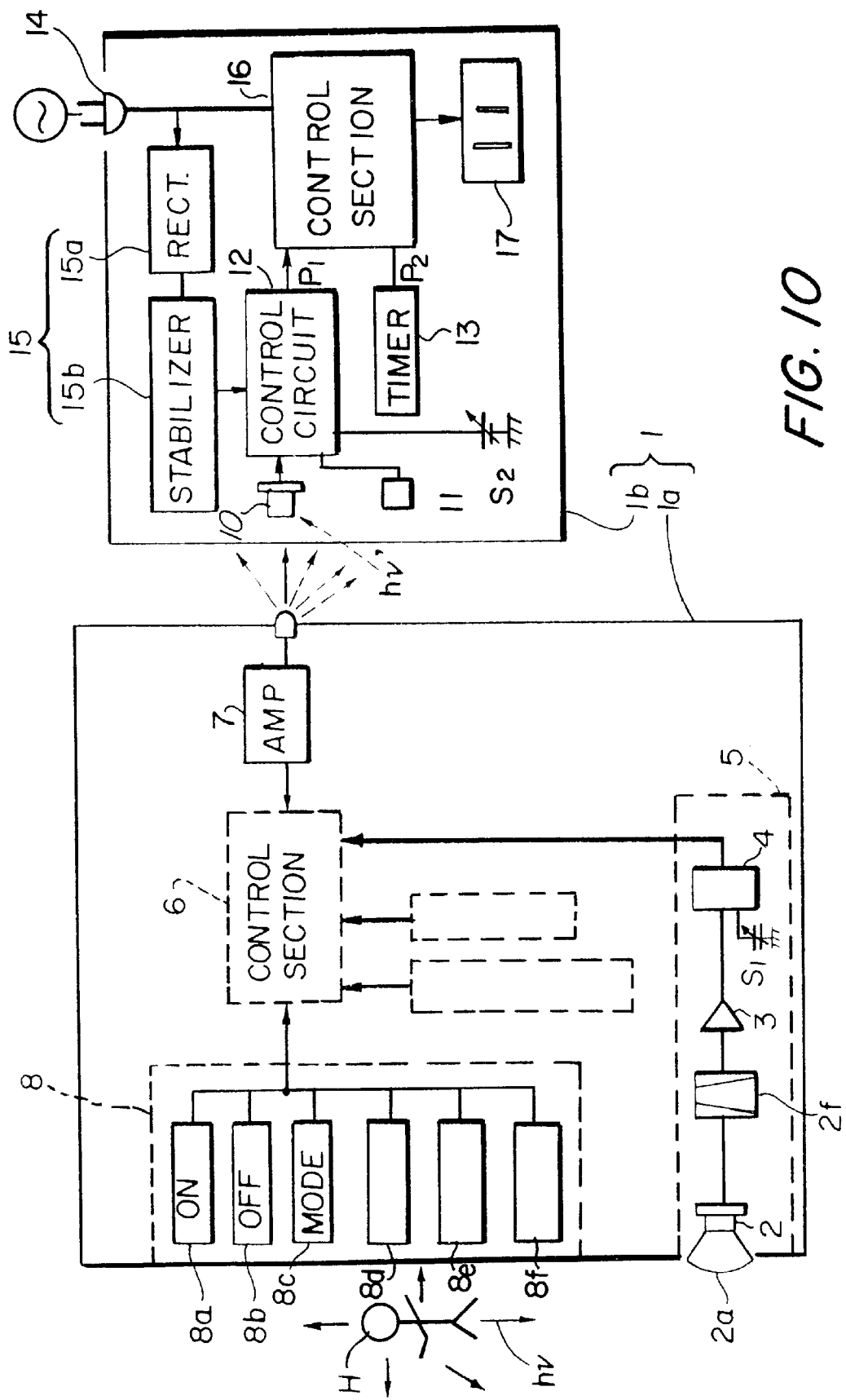
FIG. 10 is a block diagram showing the power supply switching system in the third embodiment.
Figure 11:
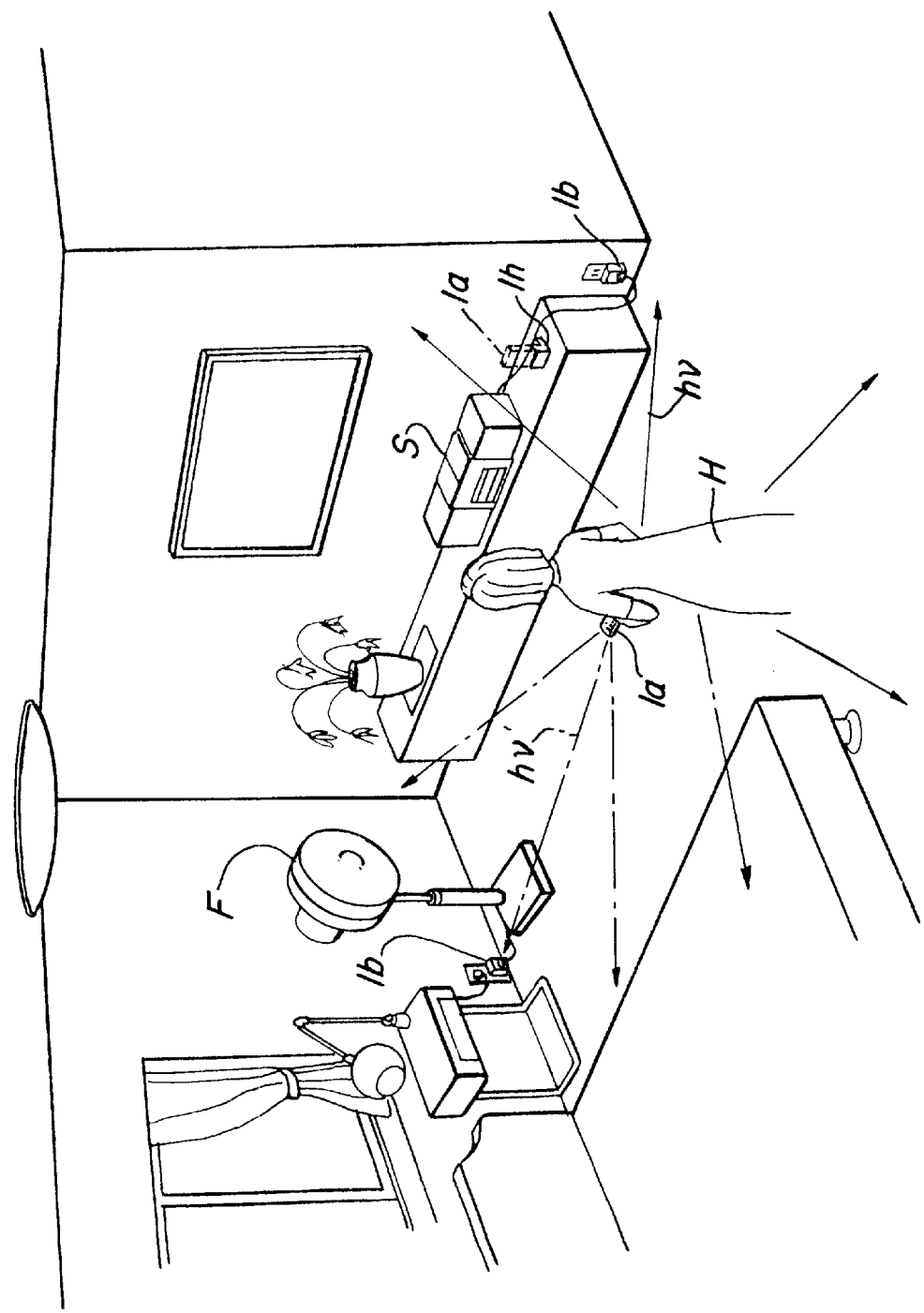
FIG. 11 is a perspective view showing an example of using the power supply switching system in the third embodiment.

FIGS. 9 to 11 show a third embodiment of the present invention. In FIGS. 9 and 10, members denoted by the same reference symbols as those shown in FIGS. 1 to 8 are the same or equivalent members, which detailed description will not be, therefore, given herein.

In this embodiment, the controller 1b has a near-infrared light receiving element 10, a light sensor 11, a control circuit 12 interpreting a control signal from the near-infrared ray received by the near-infrared ray receiving element 10 and generating a human body detection pulse $P_1$ or connected to the light sensor 11, measuring ambient illumination and controlling the controller 1b. That is to say, in this embodiment, the light sensor 11 is provided at the controller 1b side, thereby making it possible to detect the illumination of the room irrespectively of the position at which the remote controller 1a is disposed.

Further, the controller 1b has a timer circuit 13 generating a Pulse $P_2$ for a certain period of time in accordance with a command from the control circuit 12, a power input section 14 connected to a commercial power source, a DC power circuit 15 consisting of a rectification circuit 15a connected to the power input section 14 and rectifying the section 14 and a stabilization power circuit 15b supplying stable DC power, an output power control section 16 switching the state of power inputted from the power input section 14 from/to a supply state to/from a non-supply state by the pulses $P_1$ and $P_2$ or adjusting supplied power, and an output socket 17 for supplying power from the output control section 16 to an electric equipment.

The timer circuit 13 is, for example, a one-shot multi-vibrator and the width of the output pulse $P_2$ can be set at, for example, several seconds to several tens of minutes. The set time of the timer circuit 13 can be set by an input switch $8e_1$ provided at the remote controller 1a to be described later. The time may be also set by the controller 1b. For example, it can be set by a variable resistance or an input switch such as a separate push button. It is also possible to fix the time of the timer circuit 13. The setting specifications can be appropriately changed and the timer circuit 13 may be omitted.

As shown in FIG. 9, the input switch 8 in this embodiment has, for example, a power ON switch 8a, a power OFF switch 8b, a sensor mode switch 8e, a power setting switch 8d, a timer setting switch 8e, and an ambient illumination monitor setting switch 8f. The power ON switch 8a is an input switch to force the controller 1b to supply power even if no human body is detected by the human body detector 5. Unless either the power OFF switch 8b or a sleep setting switch $8f_3$ to be described later is depressed, the switch 8a allows the controller 1b to supply power.

Therefore, by depressing the power ON switch 8a, the user can switch the mode of the power supply system 1 to a manual mode. Even if the human body detector 5 does not detect a human body, power supply signals $P_1$ can be continuously outputted to the signal control circuit 12 in the controller 1b and supply of power to the electric equipment can be continued. Therefore, if, for example, a fan is connected as the electric equipment, the user does not need to always move so as to actuate the fan by depressing this power ON switch 8a. If a lighting equipment is connected, it is possible to prevent the lighting equipment from being turned off while the user is in the room.

Meanwhile, the power OFF switch 8b is an input switch for stopping supply of power. In a state in which power is being supplied by the power ON switch 8a or a state in which the sensor mode switch 8c is functioning (including a wait state), supply of power to the electric equipment is stopped when the power OFF switch 8b is depressed.

Next, the sensor mode switch 8c is an input switch for switching the power supply system 1 to a sensor mode in which the state of the controller 1b is automatically switched to a power supply state when the human body detector 5 detects a human body. This switch is used when the user wants to allow the human body detector 5 to automatically control supply of power while the power supply system 1 is set in a manual mode by the depression of either the power ON switch 8a or the power OFF switch 8b or when the state of the controller 1b is forced to be switched to either a power supply state or a power non-supply state.

Here, if the sensor mode switch 8c is depressed, a dead time for ignoring the human detection signal for a certain time (e.g., about 10 seconds) is provided. Therefore, the user can avoid any deficiency that the operation of depressing this switch to turn the system 1 into a wait state (switch the system 1 to a sensor mode) is detected and supply of power is started. As another constitution, if the sensor mode switch 8c is depressed, the human body detection signal may be ignored for a certain time (e.g., about 10 seconds) to maintain a power supply state. That is, if the electric equipment is used as a night lighting equipment, the light is turned on for about 10 seconds and turned off to start a wait state, so that the user is not left in the dark soon after the switch operation.

It is noted that 10 seconds taken as a certain time for which the human detection signal is ignored, is only one example and should not limit the present invention. The certain time can be set at a short time in a reasonable range.

Further, the settings by using input switches 8d to 8f to be described in detail later are stored in either the near-infrared remote controller control section 6 of the remote controller 1a or the control circuit 12 of the controller 1b irrespectively of the operation of the input switches 8a to 8c. In the following description, the input switches 8 are taken as push button switches; however, the present invention is not intended to limit the shapes of input switches and slide switches or toggle operation switches may be used.

The power setting switch 8d (input switch for power setting) sets the mode of relevant power supplied in any operation mode (sensor mode, manual mode). The power setting switch 8d has an ordinary power setting switch $8d_1$ for supplying ordinary power, and an energy saving power setting switch $8d_2$ for supplying decreased power. Namely, by adjusting the power supplied to the electric equipment, it is possible to reduce power consumption and to control the operation of the electric equipment to some extent.

Electric power reduction control may be carried out by the chopping of a semiconductor such as a triode AC switch or a thyristor provided at the output power control section 16 or by voltage step-down by a sliding voltage regulator or a coil, or by an inverter. Further, the energy saving power setting switch $8d_2$ is depressed several times, the reduced power can be gradually regulated. Alternatively, the set quantity of power may be displayed on a display section 16a of the remote controller 1a.

The timer setting switch 8e (input switch for timer setting) sets modes of the timer circuit 13 significant for the sensor mode. The timer setting switch 8e consists of a fixed time setting switch $8e_1$ for measuring a certain time after the controller 1b is switched to a power supply state by the timer circuit 13 and for switching automatically the controller 1b to a power non-supply state, and a constant supply setting switch $8e_2$ for continuing supply of power until a power off operation is carried out or the sensor mode switch 8c is depressed again after the state of supply power becomes a supply state.

The certain time set by the timer circuit 13 can be changed according to the number of times of depressing the certain time setting switch $8e_1$. In this embodiment, the certain time can be set at, for example, 30 seconds to 30 minutes. Also, in this embodiment, the timer setting switch 8e is significant for the sensor mode. However, it could be easily interpreted to make a modification such that the timer setting is significant for the manual mode.

Moreover, in this embodiment, the time set by the timer circuit 13 can be checked by the LED display 13a of the controller 1b and of the remote controller 1a. The present invention should not limit the time setting constitution. For example, it is possible to provide the LED display 13a only at the remote controller 1a, to use a liquid display, or to allow discrimination according to the length or type of a beep emitted by the controller 1b when it receives a near-infrared ray hv' control signal. (The same thing is true for the display on the display section 16a.)

The ambient illumination monitor setting switch 8f (input switch for ambient illumination monitor setting) sets modes for ambient illumination monitoring significant for the sensor mode. The ambient illumination monitor setting switch 8f has an illumination control setting switch $8f_1$ for monitoring the ambient illumination detector 11 and controlling it to determine whether to supply power upon detection of a human body according to ambient illumination, an illumination control stop switch $8f_2$ for ignoring the ambient illumination detected by the ambient illumination detector 11 and a sleep control switch $8f_3$ for maintaining a power non-supply state while the user is asleep.

In this embodiment, by depressing the illuminance control setting switch $Sf_1$, a control operation mode in which power is supplied upon detection of a human body if ambient illumination is bright can be switched to/from a control operation mode in which power is supplied upon detection of a human body if ambient illumination is dark. The setting state can be checked by the LED display 11a. As in the case of the LED display 13a and the display section 16a, various modifications can be made as to how to check a setting state on the LED display 11a.

Further, whether the ambient illumination is bright or dark is determined by a threshold $S_2$. The threshold $S_2$ is adjustable as shown in, for example, a variable power source of FIG. 2. Needless to say, whether the ambient illumination is bright or dark can be set by another means such as a remote control using the remote controller 1a.

If power is supplied upon detection of a human body while ambient illumination is bright, the electric equipment can be moved only while the room is bright. Due to this, even if the power supply system 1 is disposed in a bedroom, it is possible to avoid detecting the user's rolling over at midnight as a movement to thereby actuate the electric equipment. That is to say, this constitution is effective for a stereo, a heater and if an electric equipment such as a reading light is put at the user's bedside.

If power is supplied while ambient illumination is dark, the electric equipment can be moved only when the installation place of the power supply system 1 is dark. Due to this, if the lighting equipment is connected as the electric equipment, in particular, the light equipment is not turned on unnecessarily, thereby contributing to power saving. It is also possible to automatically output reduced power when the ambient illumination is dark.

Furthermore, different values may be set between a lightness threshold for determining whether ambient illumination is bright and that for determining whether ambient illumination is dark. By doing so, power can be supplied according to the level of illumination. That is, the highest output power may be supplied when the ambient illumination is darkish and power may be reduced and then outputted when the ambient illumination is fully dark. In that case, it is possible to prevent turning on the light equipment at midday following the connection of the lightning equipment, and to control the equipment not to emit uncomfortably, excessively bright light at midnight.

If the illumination is set such that the maximum power is outputted when the ambient illumination is bright and that power is reduced and outputted when it is dead dark, then it is possible to operate, for example, a connected fan or a heater at the maximum power only when the lighting equipment in the room is turned on. Further, if reduced power is supplied to the equipment while the user is asleep, this advantageously contributes not only to power saving but also to preventing the user from catching cold in sleep because the fan blows too strong of a wind.

Moreover, if the sleep control switch $8f_3$ is depressed, the signal control circuit 12 controls the output power control section 16 to stop supply of power. Thereafter, the circuit 12 controls the output power control section 16 not to supply power even if a human body detection is made unless the operation of the input switch 8 is carried out. The light sensor 11 is monitored to check that the ambient illumination becomes bright once and then dark, whereby it is possible to start supply of power in the sensor mode according to the detection of a human body.

By doing so, if the user depresses the sleep control switch $8f_3$ before asleep, it is possible to not only prevent the electric equipment from being inadvertently actuated due to the user's tossing about in sleep but also to automatically supply power according to the detection of a human body again the next evening. The setting of time for which this human body detection is not made can be made by a long-time timer capable of measuring time at least until the next morning.

FIG. 11 shows an example of supplying power to a fan F and a stereo S, which are examples of the electric equipment, by using the power supply system 1 of the present invention. As shown in FIG. 3, by connecting the power source sockets of the electric equipments F and S, which are control targets, to a commercial power source through the controller 1b, the equipments F and S can be controlled remotely.

In this example, a case where one remote controller 1a outputs control signals to two controllers 1b is disclosed; however, the present invention is not intended to be limited to this arrangement. Namely, remote controllers 1a corresponding to the respective controllers 1b may be provided to allow the control signals to be determined by their communication code. Alternatively, one remote controller 1a may output different control signals to a plurality of controllers 1b.

First, as shown in an imaginary line, while the remote controller 1a is put in the remote controller holder 1h, the human body detector 5 provided at the remote controller 1a detects the change of infrared intensity caused by the movement of the user H and the fan F and/or the stereo S can be thereby automatically actuated. If desired, the user H may hold the remote controller 1a in his/her hands and operate the power ON switch 8a or the power OFF switch 8b, thereby making it possible to control the fan F and the stereo S remotely.

Additionally, by operating the above-described various input switches 8d to 8f and appropriately setting the operation mode of the power supply system 1, the electric equipment can be controlled more truly to the user's will.

For instance, if the fan F and the stereo S are controlled as shown in this example, the constant supply setting switch $8e_2$ is depressed to thereby make it possible to continuously supply power once a human body is detected. In that case, even if the user H who enters the room is not constantly in motion, the fan F and the stereo S are not inadvertently stopped because the timer is up. In that case, when leaving the room, the user H operates the power OFF switch 8b of the remote controller 1a. After the passage of a certain time (e.g., after 10 seconds), the system I is set in a sensor mode again to thereby conduct power source control based on the detection of a human body.

On the other hand, the timer is set at a few minutes in respect of the fan F-side controller 1b, whereby the user H may actuate the fan F by performing a simple operation such as waving hands only when the user H feels hot. Also, the timer is set at a few minutes in respect of the stereo S-side controller 1b, whereby the power of the stereo S can be automatically turned off after the user H goes to sleep.

At this moment, using the illumination control setting switch $8f_1$, such a setting may be made that the stereo S is actuated only when the room is bright. That is, by turning off the stereo S before going to sleep, it is possible to prevent the stereo S from being actuated by the user's tossing about in sleep and it is also possible to actuate the stereo S when the user H wakes up next morning.

Further, by directing the remote controller 1a toward the fan F-side controller 1b and depressing the energy saving power setting switch $8d_2$, power supplied to the fan F can be regulated and the fan F can be set to blow a breeze by remote control. The energy saving power setting may be made in cooperation with the light sensor 11 described with reference to FIGS. 1 and 2, such that when the ambient illumination is very dark, reduced power is supplied to the fan F to allow the fan F to blow a breeze.

As stated above, by providing the remote controller 1a with the power ON switch 8a and the power OFF switch 8b, it is possible to conduct control in accordance with the user's demand. Besides, by providing the remote controller 1a with the input switches 8d to 8f for power setting, timer setting and ambient illumination monitor setting and providing the power supply system with various operation modes, it is possible to conduct arbitrary control in accordance with the respective electric equipment F and S.

FIGS. 12 to 15 show another mode of the present invention in which the remote controller 1a is provided with an infrared detector serving as the human body detector 5. In FIGS. 12 to 15, reference symbol 1 denotes a power supply system detecting an infrared ray hv at a wavelength of about 10 μm emitted from a human body H and controlling the power source to a lighting equipment 100 (e.g., a fluorescent lamp provided in the ceiling of the room). In this example, the power supply system 1 consists of a remote controller 1a and a controller 1b provided at the lighting equipment 100 side.

In FIGS. 12 to 15, members denoted by the same reference symbols as those in FIGS. 1 to 11 are the same or equivalent members.

In this example, the remote controller 1a has a near-infrared remote controller control section 6 receiving a human body detection pulse from the human body detector 5 and generating a control signal to be transmitted to the lighting equipment 100-side controller 1b, an amplifier 7 amplifying this control signal, light emitting diode L for infrared rays which converts the amplified control signal into a near-infrared ray hv' at a wavelength of about 0.7 to 1.3 μm and emits the resultant infrared ray, and an input switch 8 for inputting various commands to the near-infrared remote controller control section 6.

The near-infrared remote controller control section 6 has a transmission code storage section 6a storing the transmission code of a control command transmitted to the controller 1b and an oscillation circuit 6b generating a modulation fundamental wave. Thus, the near-infrared remote controller control section 6 not only generates the near-infrared ray hv' control signal but also controls the remote controller 1a. That is, as shown in this mode of the invention, if the human body detector 5 is provided at the remote controller 1a, the human body detection signal of the human body detector 5 is ignored and the near-infrared ray hv' is not generated depending on the operation mode.

Figure 12:
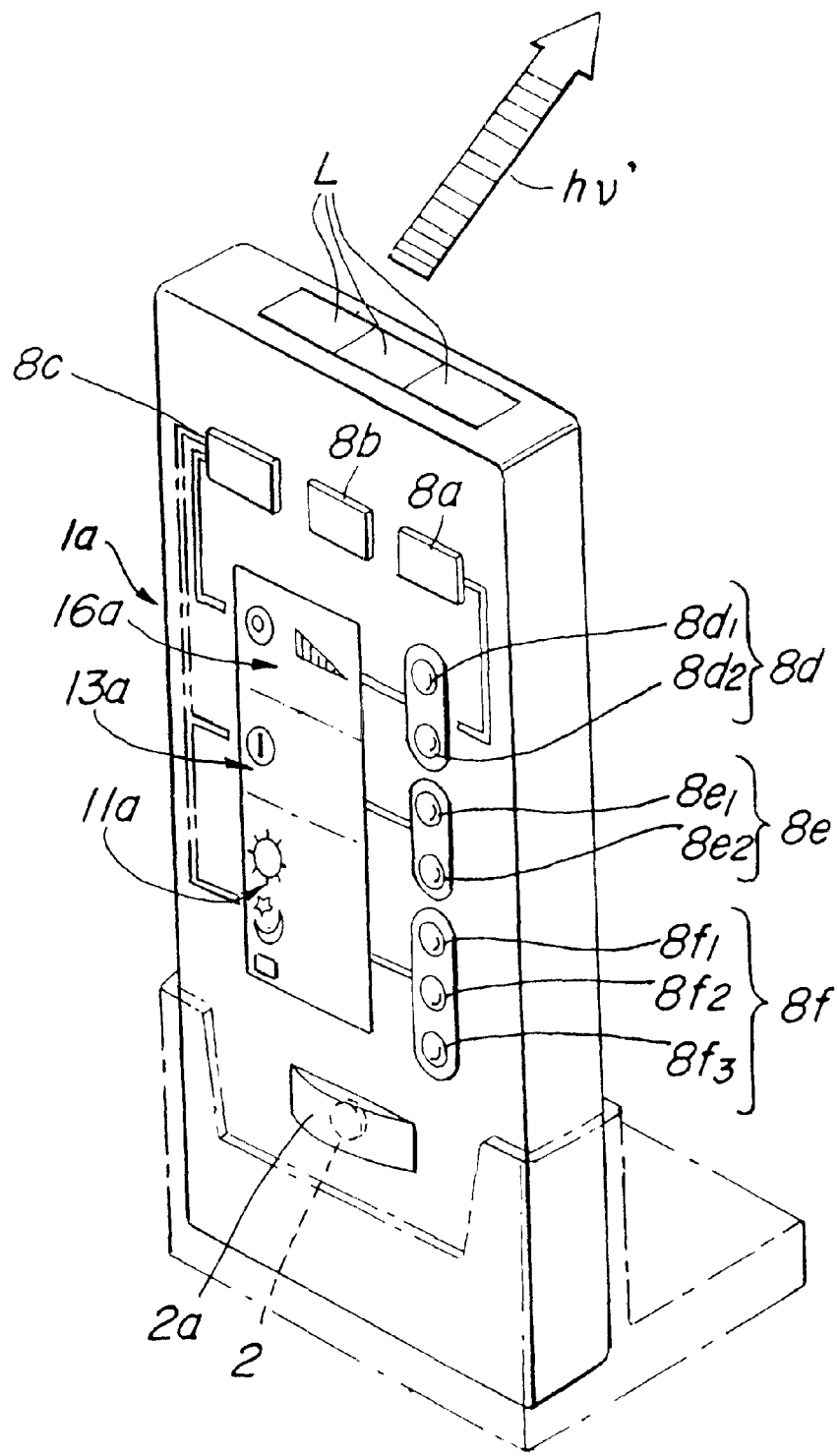
FIG. 12 is a perspective view showing a remote controller used in one mode of the present invention.

While FIG. 12 shows that the light emitting diode L is attached onto the upper surface U of the remote controller 1a, the light emitting diode L can be provided on the front surface I or the side surface J of the remote controller 1a to make it easier for the near-infrared ray hv' to reach the controller 1b provided at the lighting equipment 100 side while the remote controller 1a is attached to the wall surface. Alternatively, the light emitting diode L can be provided on the entire surface of the remote controller 1a to make it possible for the near-infrared ray hv' to reach the controller 1b more surely in whichever circumstances the remote controller 1a may be left.

Figure 14:
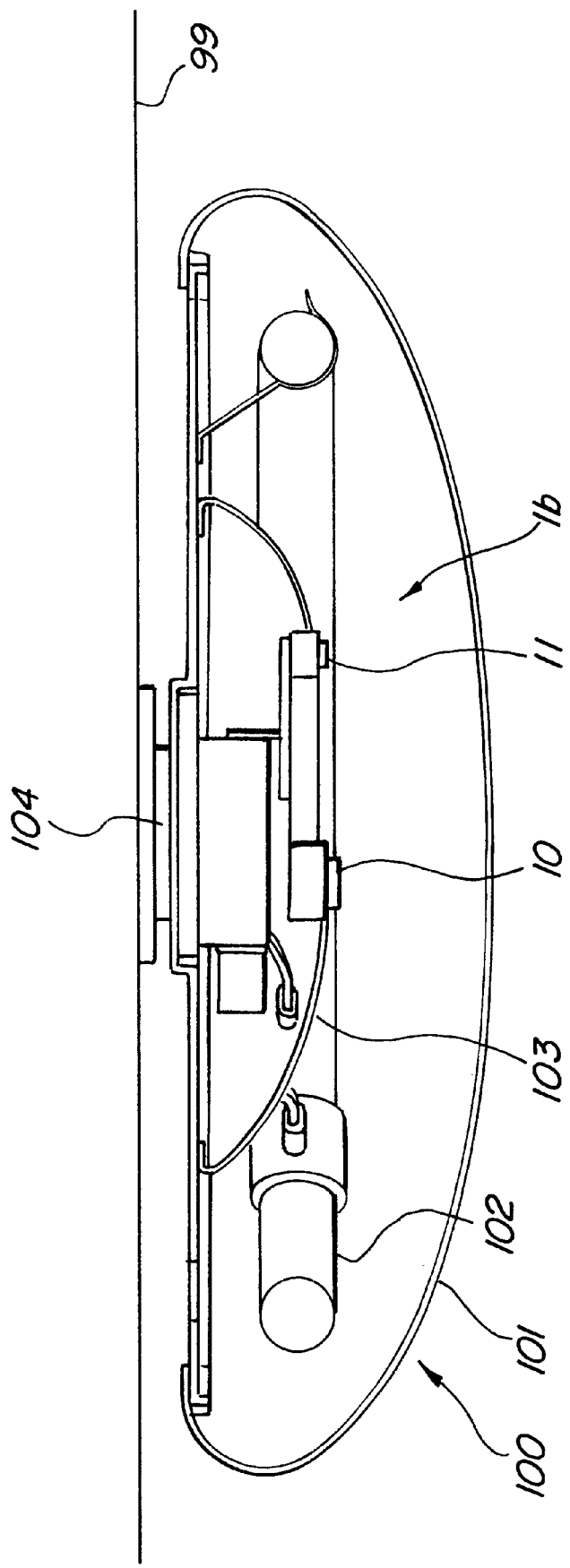
FIG. 14 is a configuration explanatory view for showing an lighting equipment in the above mode.
Figure 15:
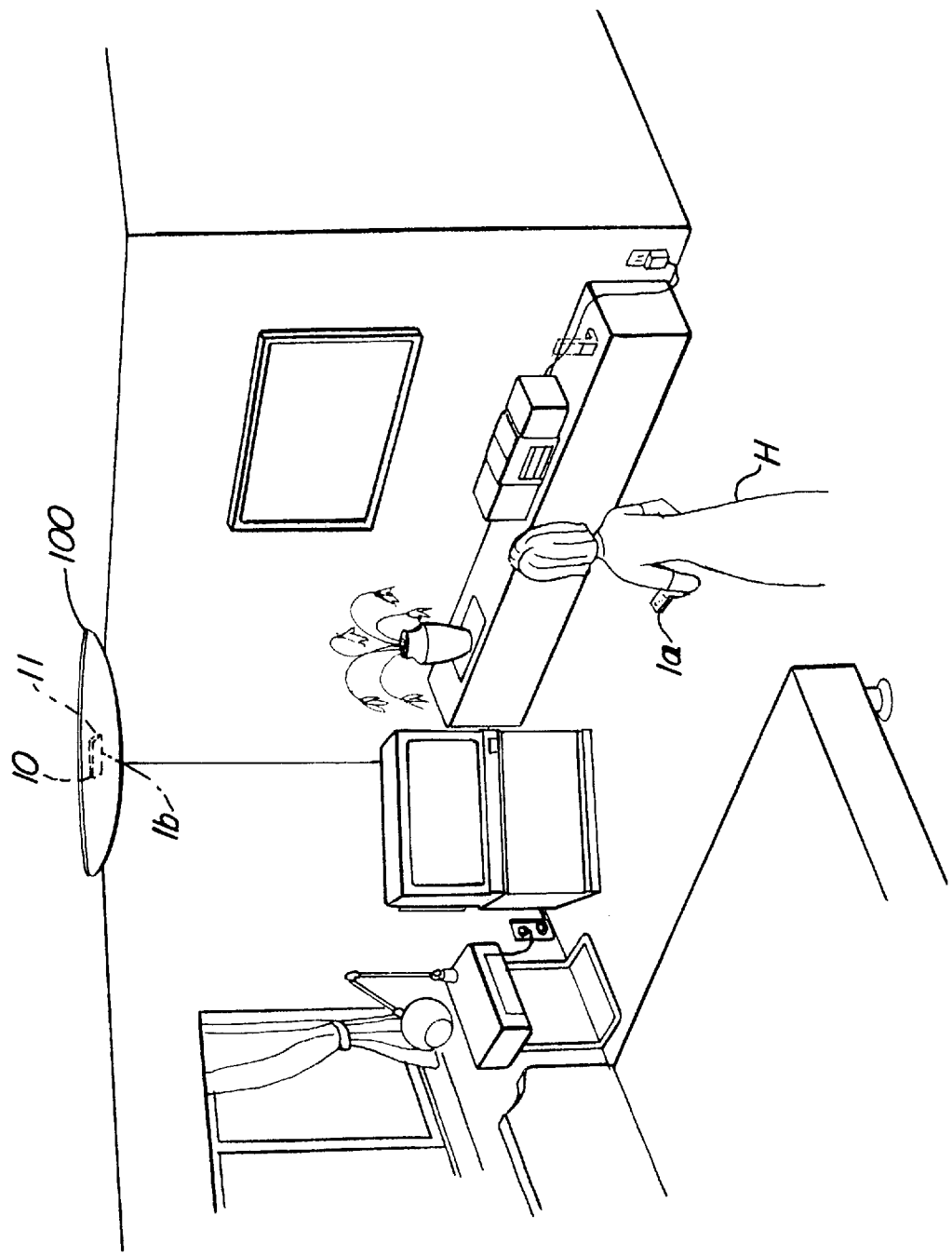
FIG. 15 is a perspective view showing that the system of the present invention is in use in the above mode.

On the other hand, the controller 1b has a near-infrared ray receiving element 10 receiving a near-infrared ray hv' transmitted from the light emitting diode L, a light sensor 11 such as a cadmium sulfide (CdS) cell or an Si photo-cell for detecting ambient lightness (ambient illumination), and a signal control circuit 12 interpreting the control signal from the near-infrared ray received by the near-infrared ray receiving element 10 and generating a pulse $P_1$ or connected to the light sensor 11, measuring ambient illumination and controlling the controller 1b. These members are contained in a case 103 which is provided together with a lighting equipment main body 102 (fluorescent lamp main body) in a cover 101 of the lighting equipment 100 provided in the ceiling 99 of the room as shown in FIG. 14. The light sensor 11 may be provided at the remote controller 1a.

Also, the controller 1b has a timer circuit 13 generating a pulse $P_2$ for a certain period of time in accordance with a command from the signal control circuit 12, an output power control section 16, which is connected to a commercial power source T, switching the state of power inputted from a commercial power source T from/to a supply state to/from a non-supply state by the pulses $P_1$ and $P_2$ or adjusting supplied power, and a DC power circuit 15 consisting of a rectification circuit 15a connected to the commercial power source T and rectifying the power and a stabilization power circuit 15b supplying stable DC power. The output power control section 16 is connected to a rosette 104 provided in the ceiling 99 so as to supply power from the output power control section 16 to the lighting equipment main body 102.

In this example, the timer circuit 13 is designed to output a pulse $P_2$ of, for example, several seconds to several minutes. While the set time of the timer circuit 13 can be set by an input switch $8e_1$ (certain time setting switch) to be described later, it may be set by variable resistance or by a separate push button or may be fixed. It is further possible to appropriately modify setting specifications such as omission of the timer circuit 13.

As shown in FIG. 12, the input switch 8 has, for example, a lighting on switch 8a, a lighting out switch 8b, a sensor mode switch 8c, a lightness setting switch 8d for setting lightness at full lightness or reduced lightness, a timer setting switch 8e and an ambient illumination monitor setting switch 8f.

The control operations using the input switches 8a to 8c in this example are the same as those using the power ON switch 8a, the power OFF switch 8b, the sensor mode switch 8c, the power setting switch 8d, the timer setting switch 8e and the ambient illumination monitor setting switch 8f which are already described with reference to FIGS. 1 to 9 except that the control target is the lighting equipment 100. Therefore, the detailed description of the control operations will not be given herein.

As can be seen, (1) a combination of the infrared detector serving as the human body detector 5 and the remote controller 1a can control the lighting equipment 100. Due to this, compared with a case of introducing a system employing infrared switches provided on the wall or in the ceiling, installed wiring is not required.

(2) A combination of the light sensor 11 for detecting ambient lightness (ambient illumination) and the remote controller 1a can control the lighting equipment 100. Due to this, by depressing the sensor mode switch 8c and the illumination control stop switch $8f_2$ or by depressing the sensor mode switch 8c and the illumination control setting switch $8f_1$, the following advantages can be obtained:

(2a) Labor for looking for the positions of a wall switch or pull-switch to turn on the lighting equipment in the dark as seen in the conventional system can be eliminated. The present invention is particularly advantageous if used in an unfamiliar hotel.

(2b) In a living room, it is possible to dispense with such daily behaviors as "depressing a lighting switch in the evening once daily to turn light on".

(3) At the time of depression, the light out switch 8b for turning off the lighting equipment main body 102 is given a certain period (e.g., about 10 seconds) of dead time for human body detection. Due to this, if the user wants to turn off the lighting equipment which has been turned on and to leave the room within the certain time period, it is possible to prevent the lighting equipment from being turned on in the room after the user has left the room and to thereby prevent wastefully turning on the lighting equipment. That is, even after depressing the light out switch 8b to forcedly turn off the lighting equipment which has been turned on, if a human body H is in the infrared detection range of the pyro-sensor 2, the lighting equipment is turned on. To prevent this, according to the present invention, either the remote control 1a or the lighting equipment 100 is provided with a function of preventing any action to detect an infrared ray from a human body H in the infrared detection range and to turn on the lighting equipment 100 after forcedly turning it off for a certain time (e.g., about 10 seconds). That is to say, the near-infrared remote controller control section 6 at the remote controller 1a side or the signal control circuit 12 at the lighting equipment 100 side is constituted to be capable of conducting control to ignore a human body detection signal from the human body detector 5 and not to generate a near-infrared ray hv'.

(4) The sleep control switch $8f_3$ for not supplying power and maintaining the lighting equipment to be turned off when the user is in sleep. Due to this, the user depresses the sleep control switch $8f_3$ before going to sleep, whereby it is possible to not only prevent the lighting equipment main body 102 from being inadvertently turned on due to the user's tossing about in sleep but also to automatically turn the light equipment main body 102 on again based on the human body detection next evening. That is to say, such a setting can be inputted by the remote controller that after the light equipment main body which has been turned on, is forcedly turned off, actions to detect an infrared ray from the human body H and to turn on the lighting equipment main body 102 are not taken unless there is a history that the illumination of the environment exceeds a certain level due to sunshine.

(5) For example, while the ambient illumination is dark, if the illumination control setting switch $8f_1$, for supplying power based on the detection of a human body is depressed but the timer certain time setting switch $8e_1$ is also depressed, the lighting equipment may be sometimes turned off (timer is out). However, if the illumination control setting switch $8f_1$ is depressed and also the constant-supply setting switch $8e_2$ for continuously supplying power is depressed until lights-out operation is conducted after the power is in a supply state, "a setting for turning on the lighting equipment main body 102 when the movement of a human body is detected in an environment of not more than a certain illumination" can be released for a toilet light or the like when there is a guest. It is, therefore, possible to prevent the guest from feeling uncomfortable because the sudden lights-out (timer's out) while the guest is in the room.

Figure 16:
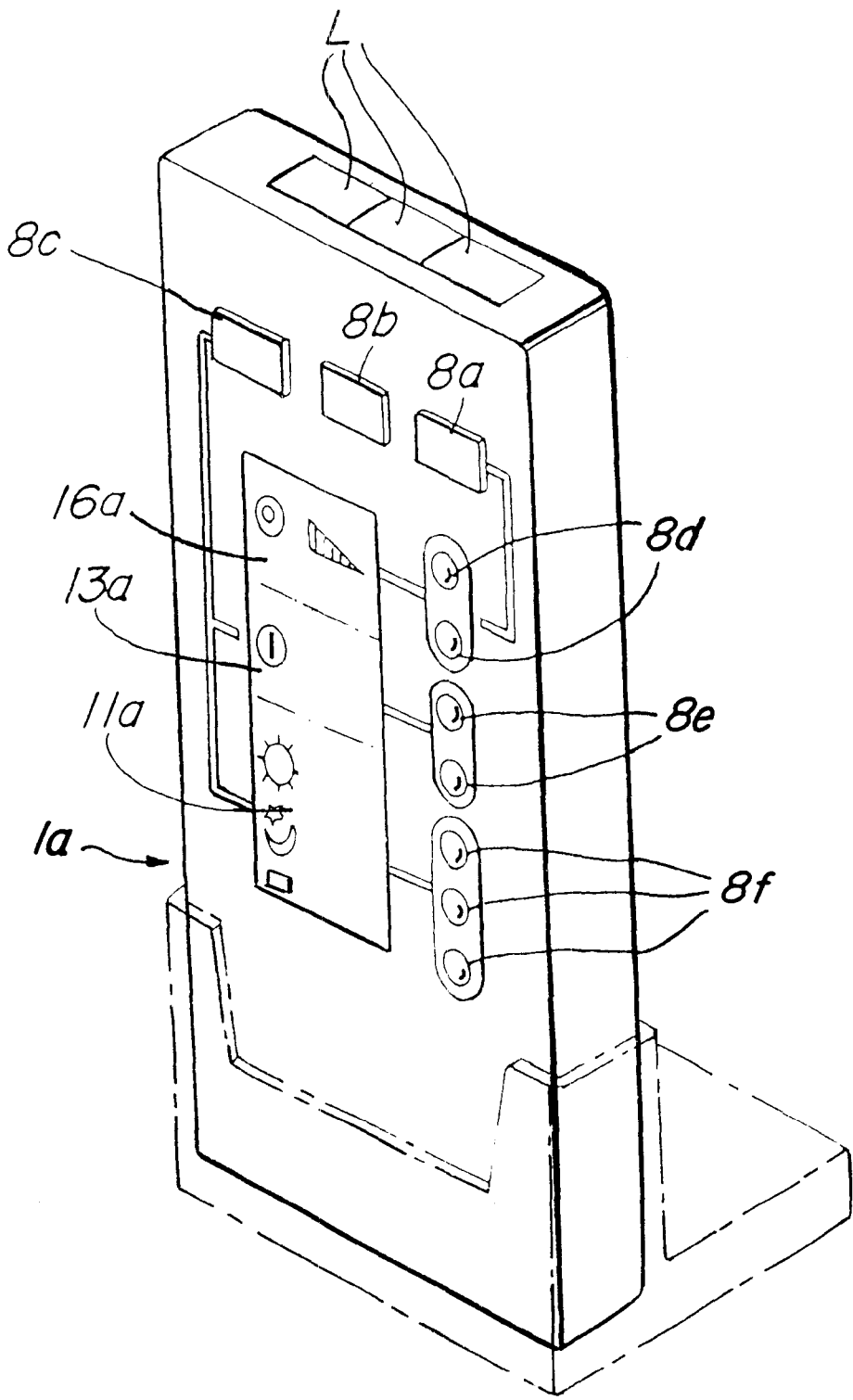
FIG. 16 is a perspective view showing a remote controller used in another mode of the present invention.
Figure 17:
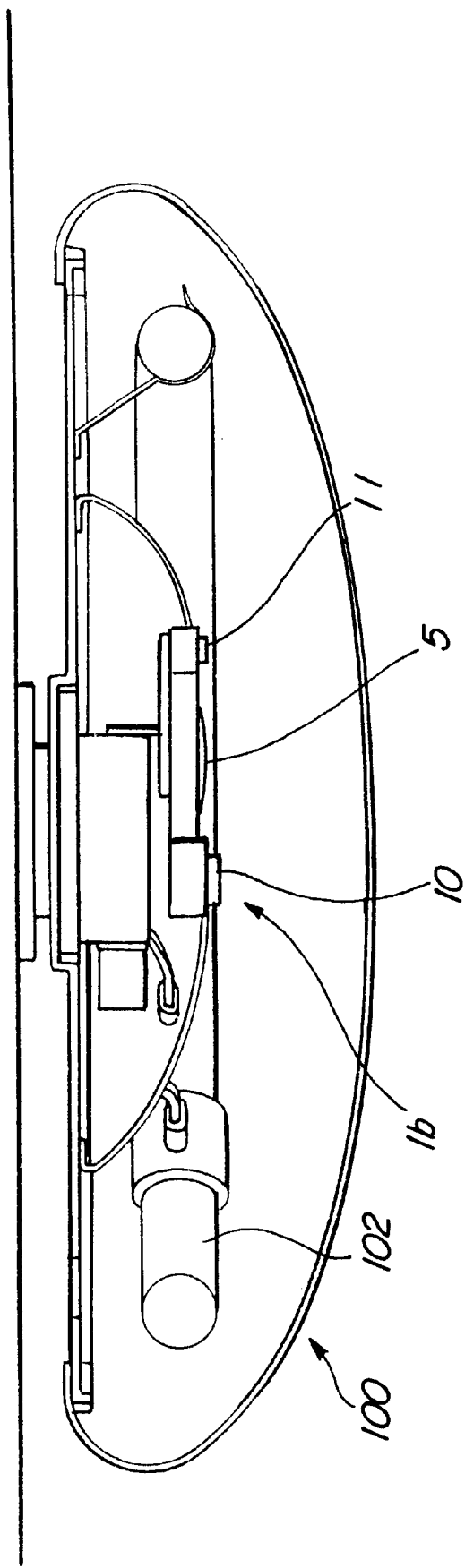
FIG. 17 is a configuration explanatory view for showing an lighting equipment in another mode.

FIGS. 16 and 17 show another mode of the present invention in which the illumination equipment 100 is provided with an infrared detector as the human body detector 5. In FIGS. 16 and 17, the members denoted by the same reference symbols as those used in FIGS. 12 to 15 are the same or equivalent members.

In this case, the user operates the remote controller 1a from outside of the detection range of the human body detector 5 of the controller 1b. By doing so, it is possible to prevent the human body detector 5 from capturing the user's operation and from instantly re-supplying power even if the illumination equipment main body (fluorescent lamp main body) 102 connected to the controller 1b is switched from a lights-on state to a lights-out state by the power OFF switch 8b.

(6) Furthermore, if the lights-out switch 8b is depressed in a sensor mode (including a wait state), the constitution of ignoring the detection of a human body by the human body detector 5 and stopping supply of power has the following advantages. Namely, if the user wants to turn off the light equipment which has been turned on and leave the room, the user can depress the lights-out switch 8b from the outside of the detection range of the human body detector 5 to thereby turn off the lighting equipment. Therefore, there is no fear that the movement of a human body is promptly detected again and the lighting equipment is turned on (it is possible to prevent wastefully turning on light in an empty room.)

Figure 13:
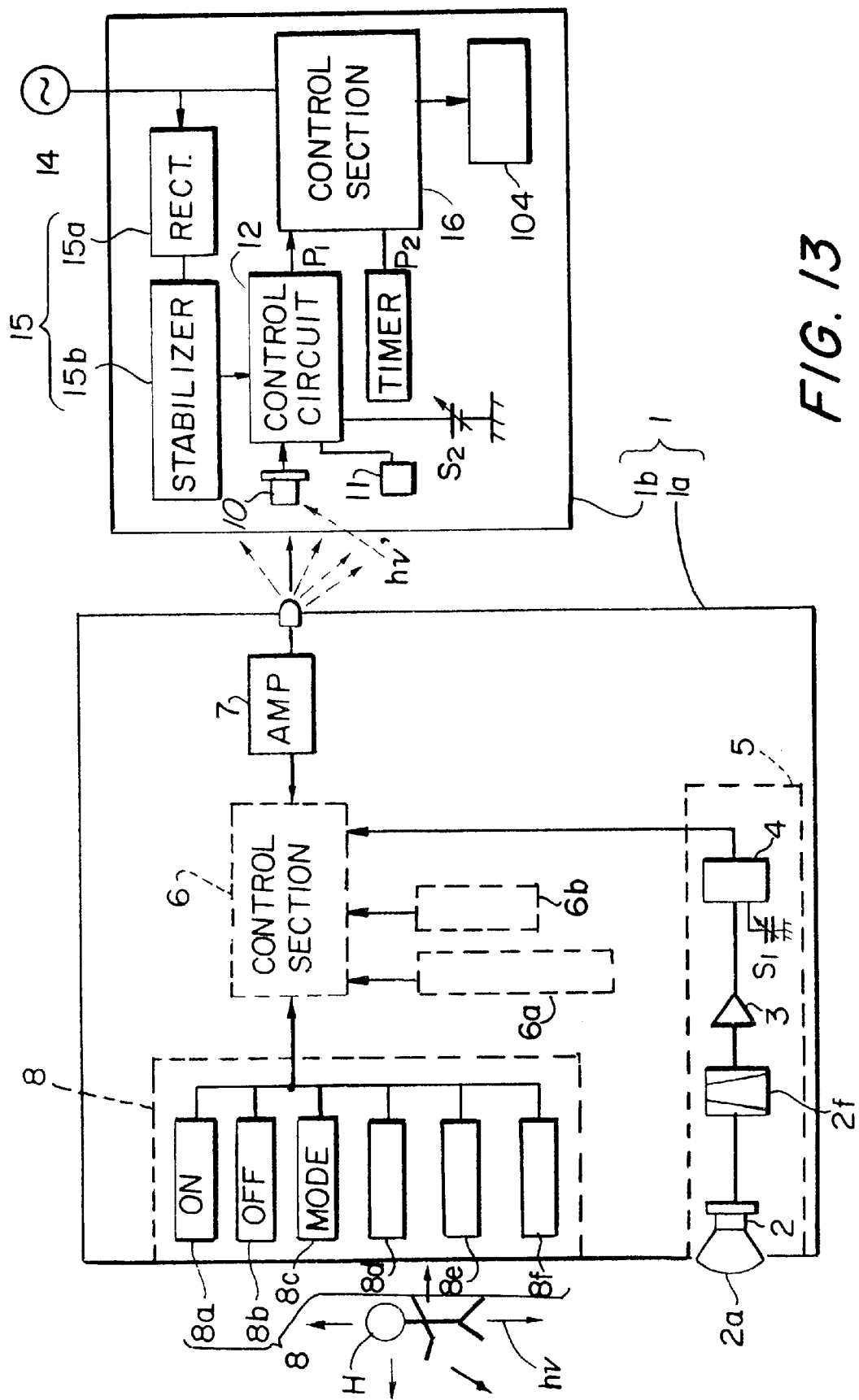
FIG. 13 is a configuration explanatory view of the entire power supply switching system in the above mode.

(7) The threshold $S_2$ which is the basis for determining whether ambient illumination is bright or dark can be adjusted as shown in, for example, variable voltage in FIG. 13 or the threshold $S_2$ can be set by the remote controller 1a. Thus, depending on the setting of the threshold of the ambient illumination detection element, it is possible to eliminate conventional disadvantages such as the user feels that a light is turned on wastefully or feels that the room is dark because a light is not turned on.

(8) Moreover, if the illumination control setting switch 8f, for supplying power based on the detection of a human body and the timer certain time setting switch $8e_1$ are depressed while the ambient illumination is dark, the user can use the power supply system in the conventional fashion.

As stated so far, the power supply switching system according to the present invention can not only automatically control supply of power to the electric equipment upon detecting a human body without the need to conduct special wiring work but can also provide a forced supply of power in accordance with user's intention and demand by operating the input switches provided at the remote controller. Further, if either the controller or the remote controller is provided with a timer for allowing the controller to maintain its power supply state for a predetermined time, the user can set a time period for a power supply operation following the detection of a human body by setting the timer. That is, when a ventilation is connected as an electric equipment, the ventilation can be controlled to be automatically actuated and be operated according to the timer.

Such a setting that the controller is turned into a power supply state following the detection of a human body and maintains its power supply state without actuating the timer, is effective if an electric equipment such as a lighting equipment or an air conditioner which is always actuated when a user enters a room and is required to be continuously supplied with power thereafter is employed. That is, since the user does not need to look for an operation section for actuating such an electric equipment when entering the room, such a setting is particular effective in the environment such as a hotel in which the user is unfamiliar with the equipment.

Further, if either the controller or the remote controller is provided with a sensor mode switch for turning the controller into a power non-supply state for a predetermined time and then into a wait state allowing the state of the controller to be switched to a power supply state following the detection of a human body by the human body detector as an input switch, supply of power by the controller can be forcedly stopped by remote control and, at the same time, it is possible to suppress the state of the controller from being switched to a power supply state upon the detection of a human body by the human body detector for a predetermined time after depressing the switch. Therefore, if supply of power to the electric equipment is temporarily stopped and the user leaves the spot, it is possible to prevent the human body detector from detecting the movement of the user to thereby start supplying power to the electric equipment again.

If either the controller or the remote controller is provided with a sensor mode switch for turning the controller into a power supply state only for a predetermined time and then temporarily turning it into a power non-supply state and a wait state allowing the state of the controller to be switched to a power supply state upon the detection of an infrared ray by the human body detector, it is possible to not only force the controller to start a supply of power by remote control but also to actuate the electric equipment only for the predetermined time.

Namely, if the electric equipment is lighting equipment, the switch is used to switch the state of the controller into a wait state. Even if the user leaves the spot, the equipment is turned on only for a predetermined time, so that it is possible to prevent the illumination from instantly becoming dark or the light from being unnecessarily turned on for a long time. If other electric equipment is connected, it is possible to check the operation thereof for the predetermined time. Specifically, in case of a stereo, it is possible to check volume or channel setting for the predetermined time.

In each of the above embodiments, the different positions and structures of the present invention are described separately in each of the embodiments. However, it is the full intention of the inventor of the present invention that the separate aspects of each embodiment described herein may be combined with the other embodiments described herein. Those skilled in the art will appreciate that adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. In a power supply system for electric equipment and a remote controller for on/off controlling the electric equipment and for establishing communication between the electric equipment and the remote controller by near-infrared rays, the improvement comprising:

a controller unit removably connectable to the electric equipment and to a source of electrical power;

input switches on the remote controller for conducting the on/off controlling, and an infrared detector for detecting an infrared ray from a human body and for on-controlling the electric equipment at the remote controller, wherein said electric equipment is lighting equipment and the on-controlling and the off controlling function turns on the lighting equipment and turns off the lighting equipment respectively, wherein said power supply system comprises an ambient illumination detection element;

a setting for turning on said lighting equipment when a movement of a human body is detected in an environment of not more than a predetermined level of illumination inputted by said remote controller; and a setting for not conducting an operation made to detect an infrared ray from the human body and to turn on said lighting equipment for a certain time after forcedly turning off the lighting equipment from an ON state, can be inputted by one of said remote controller and lighting equipment site.

2. A remote power switching system comprising:

a controller unit having a switching unit capable of removably connecting to a source of power and removably connecting to an electrical device for controlling the output of power to the electrical device that utilizes the power and a wireless receiver unit for receiving control signals to operate the switching unit; and a remote controller having a first sensor unit for determining the presence of an object that intrudes within a predetermined zone, a transmitter unit for transmitting a wireless signal, and a control unit for forwarding a wireless signal, when the first sensor unit determines the presence of a moving object, to the controller unit to activate the output of power and control members for delaying the activation of the control unit for a predetermined time period to permit a user to leave the predetermined zone after set up.

3. The invention of claim 2 further including a timer unit for providing a set period of time for outputting power after the last time the first sensor unit detects an object.

4. The invention of claim 3 wherein the remote controller includes a second sensor unit for determining a level of ambient light and the control unit forwards a wireless signal only when the level of ambient light is below a predetermined threshold.

5. The invention of claim 4 further including a masking label to block the second sensor unit.

6. The invention of claim 4 wherein the controller unit includes a connector for attachment to a source of power in a ceiling.

7. The invention of claim 4 wherein the controller unit has a pair of terminal prongs for mounting in an electrical wall power output and a pair of power electrical receptacles for providing a plug in connection for the device to be controlled.

8. The invention of claim 7 further including a Fresnel lens operatively positioned before the first sensor unit for defining the predetermined zone.

9. A remote power switching system for providing power to electrical devices, comprising:

a controller unit having a pair of terminal prongs for mounting in an electrical wall power outlet and a pair of power electrical receptacles for providing a plug for connection with an electrical device, the controller unit having a switching unit capable of connecting to a source of power through the terminal prongs and controlling the output of power to the electrical device that utilizes the power and a wireless receiver unit for receiving control signals to operate the switching unit; and a remote controller having a Fresnel lens and a first sensor unit for determining the presence of a human within a predetermined zone defined by the Fresnel lens, a transmitter unit for transmitting a wireless signal, and control unit for forwarding a wireless signal when the first sensor unit determines the presence of a human to the controller unit to activate the output of power.

10. The invention of claim 9 further including a manual override switch on the remote controller to activate the controller unit regardless of the first sensor unit.

11. The invention of claim 10 further including a light indicator on the controller unit to indicate an "ON" state.

12. The invention of claim 11 further including means for delaying the "ON" state of the controller unit for a predetermined time period.

13. The invention of claim 12 further including a second sensor unit for determining a level of ambient light and the control unit forwards a wireless signal only when the level of ambient light is below a predetermined threshold.

14. The invention of claim 13 further including a removable light shielding seal member for blocking the second sensor unit.

15. The invention of claim 13 further including a timer circuit in the controller unit and a visual indicator on the controller unit disclosing a time period set by the timer circuit.

\* \* \* \* \*